United States Patent
Kim

(10) Patent No.: US 11,524,717 B2
(45) Date of Patent: Dec. 13, 2022

(54) ELECTRIC POWER STEERING APPARATUS AND CONTROL METHOD THEREOF

(71) Applicant: MANDO CORPORATION, Pyeongtaek-si (KR)

(72) Inventor: Jung-Yeol Kim, Seongnam-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 453 days.

(21) Appl. No.: 16/556,337

(22) Filed: Aug. 30, 2019

(65) Prior Publication Data

US 2020/0070879 A1 Mar. 5, 2020

(30) Foreign Application Priority Data

Sep. 5, 2018 (KR) .................. 10-2018-0105945
Sep. 6, 2018 (KR) .................. 10-2018-0106602

(51) Int. Cl.
| | | |
|---|---|---|
| B62D 1/181 | (2006.01) | |
| B62D 1/183 | (2006.01) | |
| B62D 5/04 | (2006.01) | |
| B62D 6/00 | (2006.01) | |
| B62D 5/00 | (2006.01) | |
| B62D 15/02 | (2006.01) | |
| B62D 6/04 | (2006.01) | |

(Continued)

(52) U.S. Cl.
CPC .............. *B62D 6/02* (2013.01); *B62D 5/046* (2013.01); *B62D 6/10* (2013.01); *B62D 15/021* (2013.01); *B62D 3/12* (2013.01); *B62D 5/0448* (2013.01); *B62D 5/0454* (2013.01)

(58) Field of Classification Search
None
See application file for complete search history.

(56) References Cited

U.S. PATENT DOCUMENTS

2014/0316655 A1* 10/2014 Degenstein ............ B62D 6/008
701/41
2015/0217807 A1* 8/2015 Schumacher ......... B60W 30/14
701/41

(Continued)

FOREIGN PATENT DOCUMENTS

| JP | 2005067280 A | 3/2005 |
|---|---|---|
| JP | 2008285060 A | 11/2008 |

(Continued)

*Primary Examiner* — Adam D Tissot
*Assistant Examiner* — Laura E Linhardt
(74) *Attorney, Agent, or Firm* — Hauptman Ham, LLP

(57) ABSTRACT

An electric power steering apparatus and a control method thereof. A motor includes a first motor providing power to move a rack and a second motor providing power to move the rack in synchronization with the first motor. A sensor includes a torque angle sensor detecting a torque value and a steering angle in response to manipulation of a steering wheel and an angle sensor detecting an angle of rotation of a sector shaft. A controller controls the motor in response to the manipulation of the steering wheel, calculates an amount of compensation rotation of the motor by comparing the steering angle and the angle of rotation, and controls an amount of rotation of the motor in accordance with an amount of compensation rotation. The amount of rotation of a vehicle's wheel is controlled, so that actual intention of the driver in steering is accurately reflected.

20 Claims, 22 Drawing Sheets

(51) Int. Cl.
  *B62D 6/02*    (2006.01)
  *B62D 6/10*    (2006.01)
  *B62D 3/12*    (2006.01)

(56) References Cited

U.S. PATENT DOCUMENTS

| | | | |
|---|---|---|---|
| 2018/0244305 A1 | 8/2018 | Cai et al. | |
| 2018/0297629 A1* | 10/2018 | Wang | B62D 5/0424 |
| 2018/0312191 A1* | 11/2018 | Sasaki | B62D 5/049 |
| 2021/0061208 A1* | 3/2021 | Horvath | B60R 21/00 |

FOREIGN PATENT DOCUMENTS

| | | | |
|---|---|---|---|
| JP | 2008290648 A | 12/2008 | |
| KR | 1019960022097 A | 7/1996 | |
| KR | 1019980054583 A | 9/1998 | |
| KR | 100746696 B1 | 8/2007 | |
| KR | 101128608 B1 | 3/2012 | |
| WO | 2013061568 A1 | 5/2013 | |

\* cited by examiner

*FIG.13*

| Vehicle Speed (KPH) | Distance to Preceding Vehicle(m) | Steering Angular Velocity(deg/s) | Output |
|---|---|---|---|
| Not Exceeding 40 | – | – | 100% |
| – | From 50 | – | 100% |
| – | – | Not Exceeding 180 | 100% |
| Exceeding 40 and Not Exceeding 80 | From 30 and Less Than 50 | From 360 and Not Exceeding 720 | 105% |
| Exceeding 40 and Not Exceeding 80 | From 30 and Less Than 50 | Exceeding 720 | 110% |
| Exceeding 40 and Not Exceeding 80 | Less Than 30 | From 360 and Not Exceeding 720 | 115% |
| Exceeding 40 and Not Exceeding 80 | Less Than 30 | Exceeding 720 | 120% |
| Exceeding 80 | From 30 and Less Than 50 | From 360 and Not Exceeding 720 | 125% |
| Exceeding 80 | From 30 and Less Than 50 | Exceeding 720 | 130% |
| Exceeding 80 | Less Than 30 | From 360 and Not Exceeding 720 | 140% |
| Exceeding 80 | Less Than 30 | Exceeding 720 | 150% |

ELECTRIC POWER STEERING APPARATUS AND CONTROL METHOD THEREOF

CROSS REFERENCE TO RELATED APPLICATION

This application claims priority from Korean Patent Application Nos. 10-2018-0105945, filed on Sep. 5, 2018, and 10-2018-0106602, filed on Sep. 6, 2018, which are hereby incorporated by reference for all purposes as if fully set forth herein.

BACKGROUND

Field

Embodiments relate to an electric power steering apparatus controlling the driving of a motor including a dual motor, provided in the electric power steering apparatus, and a control method thereof.

Description of Related Art

In general, a steering apparatus of a vehicle is an apparatus allowing a driver to change the direction of travel of the vehicle as intended. An electric power steering apparatus is an apparatus assisting a driver to change the direction of travel of the vehicle. When the driver manipulates or rotates the steering wheel of the vehicle, the electric power steering apparatus increases the power of the driver manipulating the steering wheel using a booster, so that the driver can change the direction of travel of the vehicle more easily with a smaller amount of power.

In addition, since the length or weight of large commercial vehicles is greater than that of typical automobiles (or passenger vehicles), strength able to withstand high power and high load is required. Conventionally, hydraulic power steering apparatuses have generally been used. As a variety of driver assistance systems have been recently introduced, a driver assistance system and an electric power steering apparatus have gradually come into use in large commercial vehicles.

Accordingly, in relation to the driving and control of electric power steering apparatuses mounted on large commercial vehicles, there is increasing demand for a control method able to control a motor so that the intention of a driver in steering can be accurately reflected.

BRIEF SUMMARY

Various aspects provide an electric power steering apparatus and a control method thereof that can control the amount of rotation of the vehicle's wheel by controlling the amount of rotation of the motor in accordance with the amount of compensation rotation calculated by comparing the steering angle and the angle of rotation of the sector shaft due to the manipulation of the steering wheel, so that actual intention of the driver in steering is accurately reflected.

Also provided are an electric power steering apparatus and a control method thereof that can more accurately control the amount of rotation of the vehicle's wheel by calculating the amount of compensation rotation of the motor in accordance with the actual amount of rotation of the sector shaft using the angle sensor disposed on the sector shaft.

Also provided are an electric power steering apparatus and a control method thereof that can provide an amount of assistance steering power suitable to the situation by selectively controlling the dual motors provided in the electric power steering apparatus depending on the traveling state of the vehicle.

Also provided are an electric power steering apparatus and a control method thereof that can control the amount of assistance steering power provided according to the mounting position of the steering wheel by controlling the dual motors provided in the electric power steering apparatus depending on the center of rotation of the steering wheel and the area held by the driver.

Also provided are an electric power steering apparatus and a control method thereof that can provide a required amount of assistance steering power by driving both the dual motors, so that a large commercial vehicle can more rapidly change lanes, in a situation in which rapid lane changing is required depending on the traveling state of the vehicle.

According to an aspect, an electric power steering apparatus may include: a motor including a first motor providing power to move a rack and a second motor providing power to move the rack in synchronization with the first motor; a sensor including a torque angle sensor detecting a torque value and a steering angle in response to manipulation of a steering wheel and an angle sensor detecting an angle of rotation of a sector shaft; and a controller controlling the motor in response to the manipulation of the steering wheel, wherein the controller calculates an amount of compensation rotation of the motor by comparing the steering angle and the angle of rotation, and controls an amount of rotation of the motor in accordance with an amount of compensation rotation.

According to another aspect, provided is a control method of an electric power steering apparatus of a vehicle. The method may include: controlling a motor in response to manipulation of a steering wheel; detecting a torque value and a steering angle in response to the manipulation of the steering wheel; detecting an angle of rotation of a sector shaft; calculating an amount of compensation rotation of the motor by comparing the steering angle and the angle of rotation; and controlling an amount of rotation of the motor in accordance with the amount of compensation rotation.

According to another aspect, an electric power steering apparatus may include: a motor including a first motor providing power to move a rack and a second motor providing power to move the rack in synchronization with the first motor; a sensor including a vehicle speed sensor obtaining a vehicle speed of a host vehicle, a steering angle sensor obtaining a steering angular velocity due to manipulation of a steering wheel, and a front sensor obtaining a distance to a preceding vehicle; and a controller controlling an operation of the first motor and an operation of the second motor so that the vehicle's wheel is steered in response to the manipulation of the steering wheel, wherein the controller drives the first motor in a normal node and drives both the first motor and the second motor in an emergency mode, in accordance with at least one selected from among the vehicle speed, the steering angular velocity, the distance to a preceding vehicle, or combinations thereof.

According to another aspect, provided is a control method of an electric power steering apparatus of a vehicle. The control method may include: driving a first motor in a normal mode so that a vehicle's wheel is steered in response to manipulation of a steering wheel, the first motor providing power to move a rack; obtaining a speed of a host vehicle, a steering angular velocity due to the manipulation of the steering wheel, and a distance to a preceding vehicle; determining whether or not to enter an emergency mode in accordance with at least one selected from among a vehicle speed, a steering angular velocity, a distance to a preceding vehicle, or combinations thereof; and if it is determined to enter the emergency mode, driving both the first motor and the second motor in the emergency mode.

According to exemplary embodiments, in the electric power steering apparatus and the control method thereof, it is possible to control the amount of rotation of the vehicle's wheel by controlling the amount of rotation of the motor in accordance with the amount of compensation rotation calculated by comparing the steering angle and the angle of rotation of the sector shaft due to the manipulation of the steering wheel, so that actual intention of the driver in steering is accurately reflected.

In addition, in the electric power steering apparatus and the control method thereof, it is possible to more accurately control the amount of rotation of the vehicle's wheel by calculating the amount of compensation rotation of the motor in accordance with the actual amount of rotation of the sector shaft using the angle sensor disposed on the sector shaft.

In addition, in the electric power steering apparatus and the control method thereof, it is possible to provide an amount of assistance steering power suitable to the situation by selectively controlling the dual motors provided in the electric power steering apparatus depending on the traveling state of the vehicle.

In addition, in the electric power steering apparatus and the control method thereof, it is possible to control the amount of assistance steering power provided according to the mounting position of the steering wheel by controlling the dual motors provided in the electric power steering apparatus depending on the center of rotation of the steering wheel and the area held by the driver.

In addition, in the electric power steering apparatus and the control method thereof, it is possible to provide a required amount of assistance steering power by driving both the dual motors, so that a large commercial vehicle can more rapidly change lanes, in a situation in which rapid lane changing is required depending on the traveling state of the vehicle.

DESCRIPTION OF DRAWINGS

The above and other objects, features, and advantages of the present disclosure will be more clearly understood from the following detailed description, taken in conjunction with the accompanying drawings, in which:

FIGS. 10 to 14 are graphs illustrating the control over the dual motors of the electric power steering apparatus according to another embodiment of the present disclosure;

DETAILED DESCRIPTION

Figure 1:
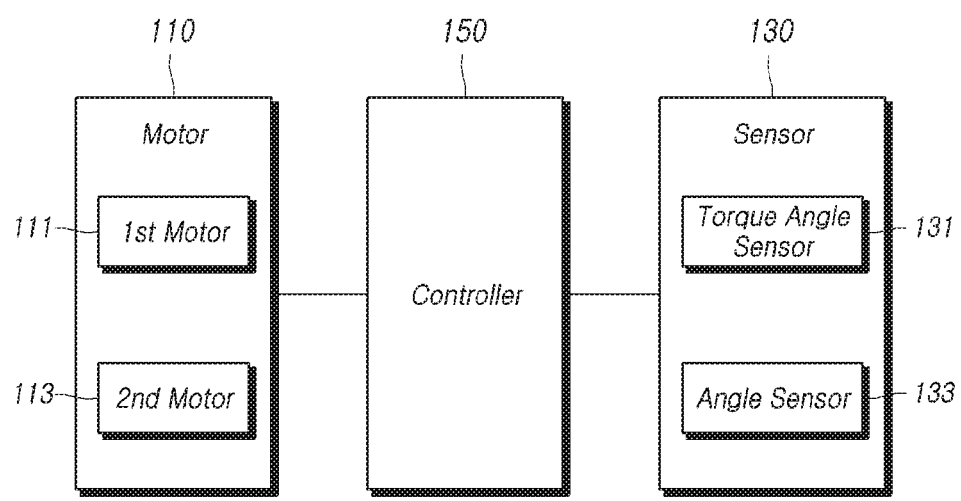
FIG. 1 is a block diagram illustrating an electric power steering apparatus according an embodiment of to the present disclosure.

Hereinafter, some embodiments of the present disclosure will be described in detail with reference to the accompanying illustrative drawings. In designating elements of the drawings by reference numerals, the same elements will be designated by the same reference numerals although they are shown different drawings. Further, in the following description of the present disclosure, a detailed description of known functions and configurations incorporated herein will be omitted in the situation in which the subject matter of the present disclosure may be rendered rather unclear thereby.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

Unless otherwise specified, all terms including technical and scientific terms used herein have the same meaning as that commonly understood by those having ordinary knowledge in the technical field to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are defined in consideration of functions thereof in embodiments of the present disclosure, but may vary depending on the intentions of users or operators, as well as practices. Therefore, the terms shall be defined on the basis of the description throughout the specification.

In the present disclosure, the term "amount of compensation rotation" means an amount of rotation, by which a motor is rotated, in order to compensate for a difference between an amount of steering intended by a driver and an actual amount of steering of a vehicle's wheel.

Although it may be more effective to apply the present disclosure to large commercial vehicles on the assumption that the electric power steering apparatus is provided with a dual motor, the present disclosure is not limited thereto. The present disclosure may be equivalently applied to other vehicles, such as automobiles, except for situations not applicable.

In general, large commercial vehicles have a greater steering ratio than automobiles (or passenger vehicles). The steering ratio may be indicated by a ratio of an angle of movement of the steering wheel with respect to an angle of movement of the vehicle's wheel. When the steering ratio is increased, power necessary for rotating the steering wheel may be reduced, but the steering of the vehicle's wheel may be obtuse or heavy. Typically, the steering ratio of large commercial vehicles is set to a range of 20 to 36:1, which is greater than the steering ratio of automobiles, in the range of 15 to 20:1. In addition, since large commercial vehicles have a steering wheel having a larger radius, a greater amount of steering is necessary for commercial vehicles than automobiles to rotate within the same radius. Thus, in a situation of sudden steering to avoid a frontward obstacle, large commercial vehicles may be more disadvantageous than automobiles.

In order to compensate for such characteristics of large commercial vehicles, the present disclosure may provide an electric power steering apparatus including a dual motor, so that evasive braking and lane changing can be performed more rapidly in an emergency mode in which rapid steering is required. Although the present disclosure may be more effectively applied to large commercial vehicles, the present disclosure is not limited thereto. The present disclosure may be applied to other vehicles in substantially the same manner, except for some situations in which the present disclosure is inapplicable.

In the present disclosure, the term "normal mode" means an operating mode in a typical situation in which assistance steering power required during steering of a vehicle can be provided by one motor of dual motors provided in an electric power steering apparatus. In addition, the term "emergency mode" means an operating mode in a situation in which additional assistance steering power is required, in addition to assistance steering power provided in the normal mode, during steering of a vehicle. That is, when a driver has rotated the steering wheel by the same degree, the vehicle's wheel may be rotated further in the "emergency mode" than in the "normal mode".

Hereinafter, an electric power steering apparatus and a control method therefor according to embodiments of the present disclosure will be described with reference to the accompanying drawings.

FIG. 1 is a block diagram illustrating an electric power steering apparatus according an embodiment of to the present disclosure.

Referring to FIG. 1, the electric power steering apparatus 100 according to the present disclosure includes a motor 110, a sensor 130, and a controller 150. The motor 110 includes a first motor 111 providing power to move a rack and a second motor 113 providing power to move the rack in synchronization with the first motor 111. The sensor 130 includes a torque angle sensor 131 detecting a torque value and a steering angle in response to a steering wheel being manipulated or rotated and an angle sensor 133 detecting an angle of rotation of a sector shaft. The controller 150 controls the motor in response to the manipulation of the steering wheel. The controller 150 calculates an amount of compensation rotation of the motor by comparing the steering angle and the angle of rotation, and controls the amount of rotation of the motor in accordance with the amount of compensation rotation.

The motor 110 may include the first motor 111 and the second motor 113 to provide assistance steering power when a driver manipulates the steering wheel of a vehicle.

The first motor 111 may provide assistance steering power necessary for moving the rack to a position in which the vehicle can be steered as intended by the driver. When the driver manipulates or rotates the steering wheel, the steering angle of the steering wheel is detected, and the first motor 111 may be driven, under the control of the controller, to provide the assistance steering power calculated on the basis of the detected steering angle.

The second motor 113 may provide assistance steering power necessary for moving the rack to a position in which the vehicle can be steered as intended by the driver. When the driver manipulates the steering wheel, the steering angle of the steering wheel is detected, and the second motor 113 may be driven, under the control of the controller, to provide the assistance steering power calculated on the basis of the detected steering angle.

In an embodiment, the second motor 113 may be driven in synchronization with the first motor 111. The first motor 111 and the second motor 113 may output power to rotate a single worm wheel in the electric power steering apparatus 100. Thus, the first motor 111 and the second motor 113 may operate in synchronization with each other.

In addition, one of the first motor 111 and the second motor 113 may selectively be operated. In addition, the first motor 111 and the second motor 113 may rotate in the same direction or in different directions.

The sensor 130 may include the torque angle sensor (TAS) 131 detecting a torque value and the steering angle in response to the manipulation of the steering wheel and the angle sensor (AS) 133 detecting the angle of rotation of the sector shaft.

In a location between the steering wheel and a first reducer, the torque angle sensor 131 may be connected to a steering shaft to detect a torque value and a steering angle, in response to the torsion and rotation of the steering shaft. The torque angle sensor 131 may provide information regarding the torque value and the steering angle, detected as above, to the controller 150. In an embodiment, the sensor 130 may include a steering angle sensor (SAS) in substitution for the torque angle sensor or provided separately. In this case, the steering angle detected by the steering angle sensor may be provided to the controller 150.

The angle sensor 133 may be disposed on the sector shaft, rotating in response to the sliding of a ball nut of a second reducer, to detect the angle of rotation of the sector shaft.

The controller 150 may control the overall operation of the electric power steering apparatus 100. In an embodiment, the controller 150 may be implemented as a microcontroller unit (MCU) or an electric control unit (EC). The controller 150 may control the first motor 111 and the second motor 113 by synchronizing the first motor 111 and the second motor 113 with each other. The controller 150 may receive status information of the first motor 111 and the second motor 113 via a controller area network (CAN). The controller 150 may control currents applied to the first motor 111 and the second motor 113 so that the vehicle's wheel is steered in response to the manipulation of the steering wheel.

The controller 150 may compare the steering angle detected by the torque angle sensor 131 with the amount of rotation of the vehicle's wheel in accordance with the angle of rotation detected by the angle sensor 133. The controller 150 may calculate a first amount of rotation, by which the vehicle's wheel is to be rotated, in accordance with the detected steering angle. The controller 150 may calculate a second amount of rotation of the vehicle's wheel in accordance with the detected steering angle.

The controller 150 may calculate an amount of compensation rotation of the motor 110 by comparing the first amount of rotation of the vehicle's wheel in accordance with the detected steering angle with the second amount of rotation of the vehicle's wheel in accordance with the detected angle of rotation. Since the torque angle sensor 131 detects the steering angle in accordance with the rotation of the steering shaft connected to the steering wheel, the steering angle detected by the torque angle sensor 131 may be interpreted as an angle of rotation of the vehicle's wheel in accordance with the intention of the driver in steering. In addition, the angle sensor 133 may be disposed on the sector shaft, which is connected to the vehicle's wheel via a pigment arm, a tie-rod, and the like. Accordingly, the angle of rotation detected by the angle sensor 133 may be interpreted as an actual angle of rotation.

The controller 150 may calculate the amount of compensation rotation of the motor 110, in consideration of a gear ratio on a route along which steering effort applied via the steering wheel and the assistance steering power provided by the motor 110 are transferred. The amount of compensation rotation of the motor 11 allows the amount of rotation of the vehicle's wheel in accordance with the detected angle of rotation to reach the amount of rotation of the vehicle's wheel in accordance with the detected steering angle. The controller 150 may control the amount of rotation of the motor 110 in accordance with the calculated amount of compensation rotation. Accordingly, it is possible to compensate for an error caused by the first reducer, the second reducer, and the like, during steering control.

In an embodiment, when both the motor 111 and the second motor 113 are being driven, the controller 150 may control currents applied to the first motor 111 and the second motor 113, so that the amount of rotation of the motor 110 satisfies the calculated amount of compensation rotation. Since the first motor 111 and the second motor 113 rotate a single worm wheel, in an embodiment, the controller 150 may control the motor 110, on the basis of the amount of rotation of the worm wheel.

In an embodiment, when one of the first motor 111 and the second motor 113 is being driven, the controller may further apply a compensation current based on the amount of compensation rotation to the motor that is being driven in order to further rotate the motor. Alternatively, a compensation current may be applied to drive the other motor that is not being driven, so that the other motor can rotate by an amount equal to the amount of compensation rotation.

That is, if the angle of rotation, by which the sector shaft is to be rotated with respect to the steering angle of the steering wheel, is not satisfied, the controller 150 may perform an angle overlay operation, i.e. may further rotate the sector shaft in accordance with the calculated amount of compensation rotation by controlling the motor 110.

As described above, it is possible to control the amount of rotation of the vehicle's wheel by controlling the amount of rotation of the motor in accordance with the amount of compensation rotation calculated by comparing the steering angle and the angle of rotation of the sector shaft due to the manipulation of the steering wheel, so that actual intention of the driver in steering is accurately reflected. In addition, it is possible to more accurately control the amount of rotation of the vehicle's wheel by calculating the amount of compensation rotation of the motor in accordance with the actual amount of rotation of the sector shaft using the angle sensor disposed on the sector shaft.

Figure 2:
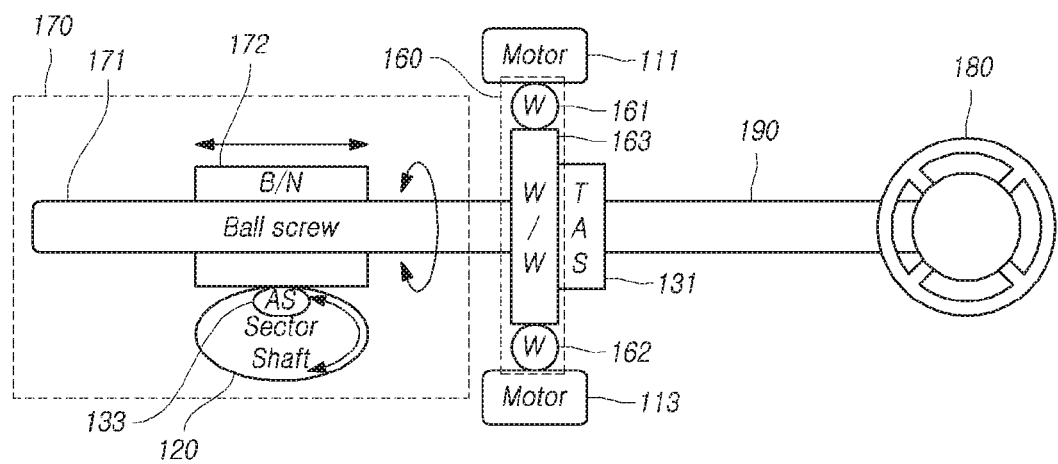
FIG. 2 is a schematic view illustrating the operation of the electric power steering apparatus according to the present disclosure.
Figure 3:
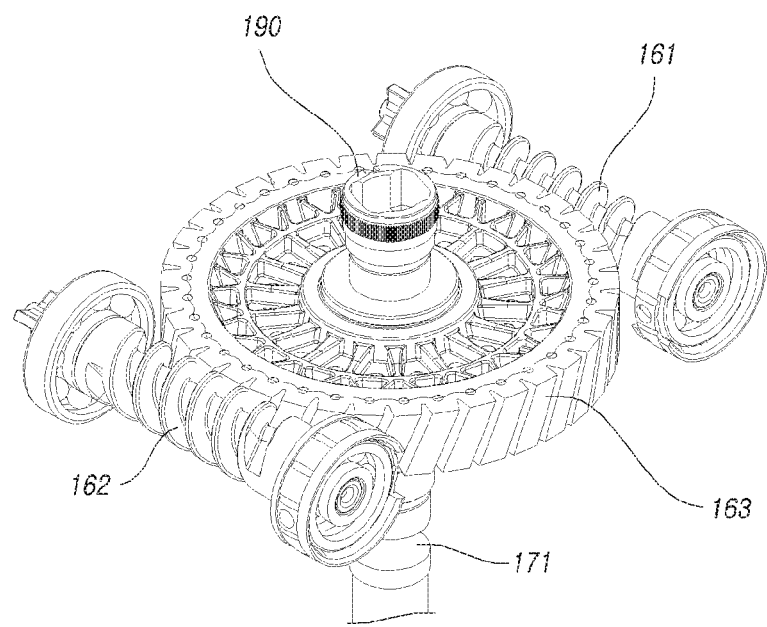
FIG. 3 is a perspective view illustrating a gear coupling structure of worm gears and a worm wheel of the electric power steering apparatus according to the present disclosure.
Figure 4:
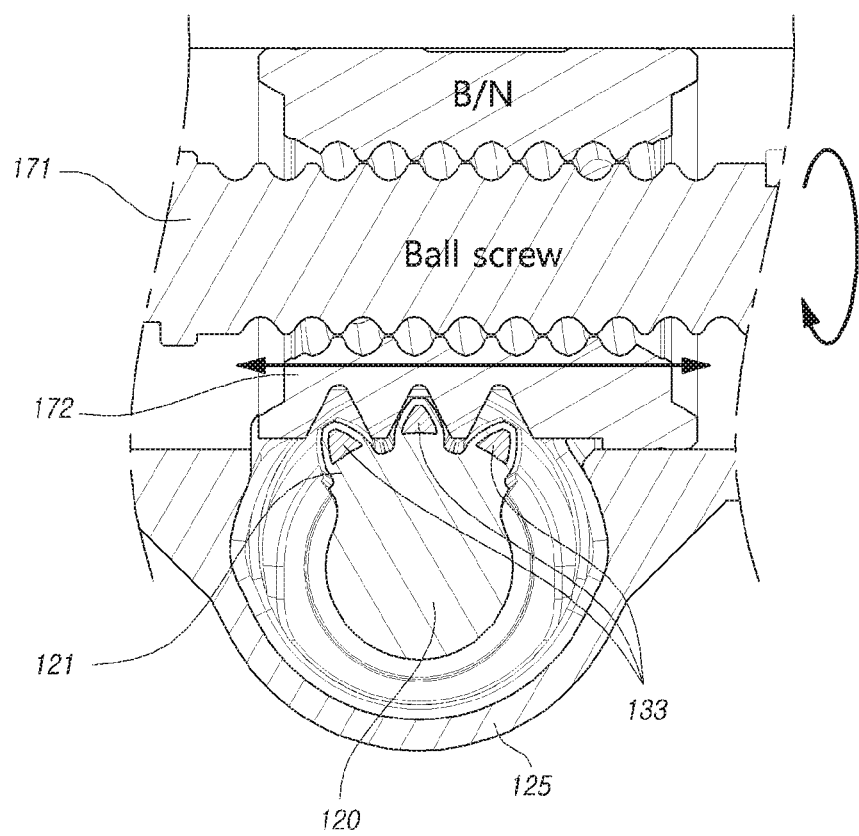
FIGS. 4 to 6 are detailed views illustrating an angle sensor disposed on the sector shaft according to the present disclosure.
Figure 5:
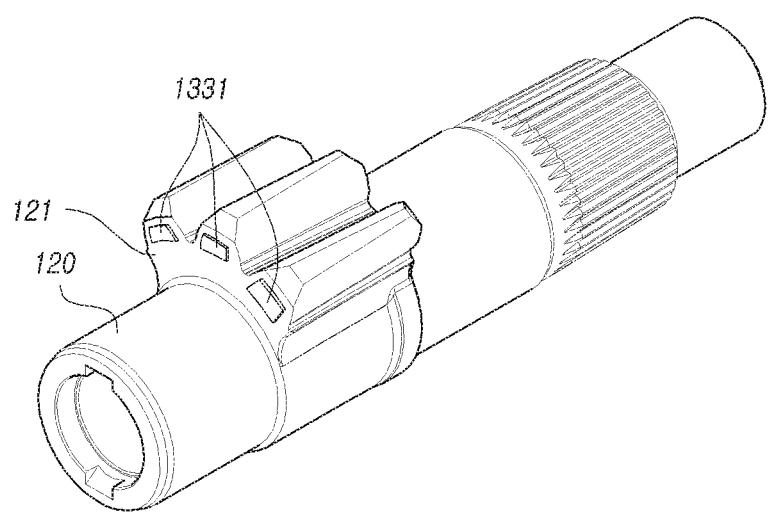
Figure 6:
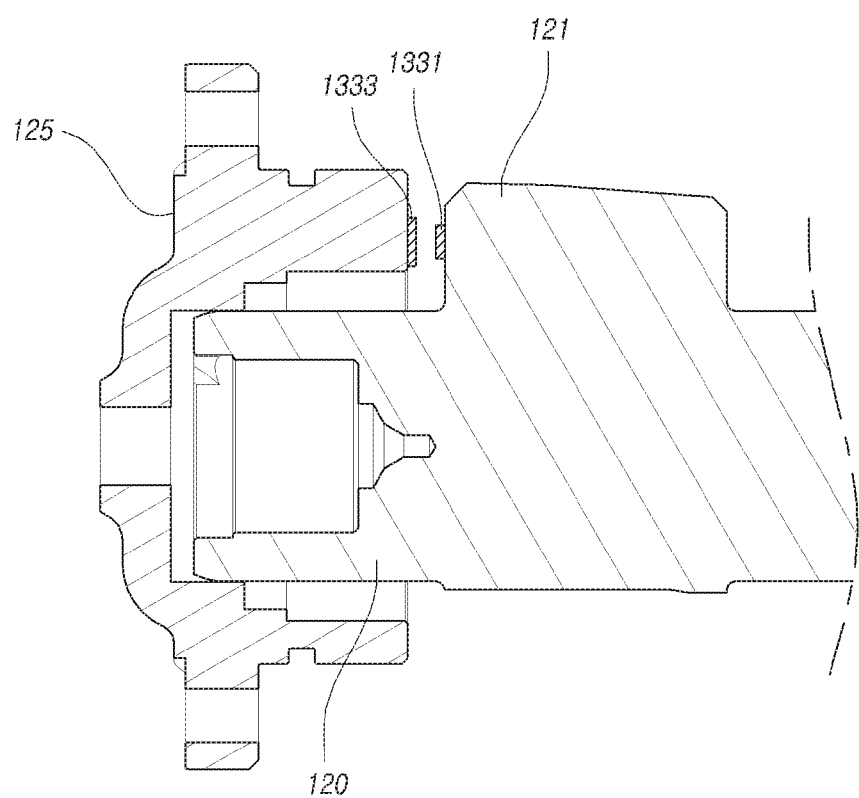

FIG. 2 is a schematic view illustrating the operation of the electric power steering apparatus according to the present disclosure, FIG. 3 is a perspective view illustrating a gear coupling structure of worm gears and a worm wheel of the electric power steering apparatus according to the present disclosure, and FIGS. 4 to 6 are detailed views illustrating an angle sensor disposed on the sector shaft according to the present disclosure.

Referring to FIG. 2, the electric power steering apparatus 100 may further include a first reducer 160 having a power transmission structure provided by engagement of worm gears 161 and 162 and a worm wheel 163 and a second reducer having a power transmission structure comprised of a ball screw 171 and a ball nut 172 to allow power provided by the first reducer to be transferred to a rack.

When a driver steers a vehicle by rotating a steering wheel 180, a steering shaft 190 rotates, and the torque angle sensor 131 may responsively detect a torque value and a steering angle. In an embodiment, a steering angle sensor detecting a steering angle may be used. The torque angle sensor 131 may be connected to the steering shaft 190, in a location between the steering wheel 180 and the first reducer 160, to detect the torque value and the steering angle in response to the torsion and rotation of the steering shaft 190. A further detailed description of the operation of the torque angle sensor 131 will be omitted, since the operation of the torque angle sensor 131 is well known in the art.

The first motor 111 may be coupled to the first worm gear 161 to rotate the first worm gear 161 when driven. The second motor 113 may be coupled to the second worm gear 162 to rotate the second worm gear 162 when driven.

The first worm gear 161 and the second worm gear 162 may be engaged with the worm wheel 163. Referring to FIG. 3, the structure according to the embodiment, in which the first worm gear 161 and the second worm gear 162 are engaged with the worm wheel 163, is illustrated. A rotary shaft of the first motor 111 may be coaxially coupled to the first worm gear 161, while a rotary shaft of the second motor 113 may be coaxially coupled to the second worm gear 162.

In an embodiment, the first motor 111 and the second motor 113 may be disposed in the same direction with respect to the first worm gear 161 and the second worm gear 162. That is, referring to FIG. 3, in a situation in which the first motor 111 is coupled to a left end of the first worm gear 161, the second motor 113 may also be coupled to a left end of the second worm gear 162, such that the first motor 111 and the second motor 113 are disposed side by side. In an embodiment, the first motor 111 and the second motor 113 may be provided as dual motors, i.e. components combined in parallel to be coupled to the first worm gear 161 and the second worm gear 162, respectively.

For example, it is assumed that the worm wheel 163 and first worm gear 161 are engaged, such that the worm wheel 163 rotates in a forward direction when the first worm gear 161 rotates clockwise in response to the first motor 111 being driven. In this case, when the second worm gear 162 rotates counterclockwise in response to the second motor 113 being driven, the worm wheel 163 may be further subjected to power in a forward direction, thereby causing greater assistance steering power to be output. In contrast, when the second worm gear 162 is rotated counterclockwise, power from the first motor 111 and power from the second motor 113 may be applied to the worm wheel 163 in opposite directions, thereby reducing assistance steering power.

Likewise, in a situation in which the first worm gear 161 rotates counterclockwise in response to the first motor 111 being driven, the worm wheel 163 may be rotated in a reverse direction. In this case, when the second worm gear 162 rotates in response to the first motor 111 being driven, the worm wheel 163 may be further subjected to power in the reverse direction, thereby causing greater assistance steering power to be output. In contrast, when the second worm gear 162 is rotated counterclockwise, power from the first motor 111 and power from the second motor 113 may be applied to the worm wheel 163 in opposite directions, thereby reducing assistance steering power in the reverse direction.

Returning to FIG. 2, when the worm wheel is rotated by the first motor 111 and the second motor 113, the ball screw 171 coupled to the worm wheel may rotate responsively. In response to the rotation of the ball screw 171, the ball nut 172 coupled to the ball screw 171 via balls may slide. When the sector shaft 120 rotates in response to the sliding of the ball nut 172, a Pitman arm coupled to the sector shaft 120 may rotate, thereby providing power to the rack.

The controller 150 may efficiently supply assistance steering power in forward or reverse steering by suitably controlling currents supplied to the first motor 111 and the second motor 113 depending on the situation of the vehicle. The controller 150 may control the operation of the motor 110, so that the electric power steering apparatus 100 may perform an operation of adjusting steering effort that the driver may detect.

The angle sensor 133 may be disposed on the sector shaft 120 to detect an angle of rotation of the sector shaft 120. The sector shaft 120 may rotate in response to the sliding of the ball nut 172 of a second reducer 170. Referring to FIG. 4, the cross-sections of the second reducer 170 and the sector shaft 120 are illustrated in an enlarged view. As illustrated above, the ball screw 171 rotates in response to the motor 110 being driven, and the ball nut 172 slides in response to the rotation of the bail screw 171. In response to the sliding of the ball nut 172, the sector shaft 120 rotates laterally, e.g. rotates to the right and left.

In an embodiment, a sector gear 121 may be provided on the outer circumferential surface of the sector shaft 120 to be engaged with the ball nut 172, and the angle sensor 133 may be disposed on one surface of the sector gear 121. Specifically, referring to FIGS. 5 and 6, the angle sensor 133 may include one or more magnets 1331 disposed on surface portions of the sector gear 121 and a magnetic sensor 1333 detecting magnetic force of the magnets 1331.

In an embodiment, as illustrated in FIG. 6, the magnetic sensor 1333 may be disposed on the surface of a housing 125 surrounding the sector shaft and the sector gear to face the magnets 1331. The magnetic sensor 1333 may detect the magnetic force of the magnets 1331. In an embodiment, the magnetic sensor 1333 may be implemented as a Hall integrated circuit (IC) sensor. However, this is only an example, and the magnetic sensor 1333 is not limited to a specific type of sensor, as long as the magnetic sensor can detect the magnetic force of the magnets.

When the sector shaft 120 rotates in response to the sliding of the ball nut 172, the magnets 1331 disposed on the sector gear 121 rotate along with the sector shaft 120. In response to the movement of the magnets 1331, the intensity of a magnetic field of each magnet detected by the magnetic sensor 133 changes. The magnetic sensor 133 may detect the angle of rotation of the sector shaft 120, on the basis of changes in the detected intensity of the magnetic field.

The angle sensor illustrated in FIGS. 5 and 6 is only an example, and the present disclosure is not limited thereto. The number and the mounting position of the magnets and the magnetic sensors may be set variously, as required. In addition, the angle sensor may not be limited to a specific sensor, as long as the angle of rotation of the sector shaft 120 can be detected.

The controller 150 may calculate an amount of compensation rotation by comparing the first amount of rotation of the vehicle's wheel calculated in accordance with the steering angle with the second amount of rotation of the vehicle's wheel calculated in accordance with the angle of rotation. The controller 150 may compare the steering angle detected by the torque angle sensor 131 with the amount of rotation of the vehicle's wheel in accordance with the angle of rotation detected by the angle sensor 133. The controller 150 may calculate the first amount of rotation, by which the vehicle's wheel is to rotate, in accordance with the detected steering angle. The controller 150 may calculate the second amount of rotation of the vehicle's wheel in accordance with the detected angle of rotation.

The controller 150 may calculate the amount of compensation rotation of the motor 110 by comparing the first amount of rotation of the vehicle's wheel in accordance with the detected steering angle with the second amount of rotation of the vehicle's wheel in accordance with the detected angle of rotation. As illustrated in FIG. 2, the torque angle sensor 131 may detect the steering angle of the steering shaft 190 connected to the steering wheel 180, due to the rotation. Since the steering angle in response to the steering wheel 180 being rotated by the driver is detected, the steering angle detected by the torque angle sensor 131 may be the angle of rotation of the vehicle's wheel intended by the driver.

As the motor 110 is driven in accordance with the above-detected steering angle, the sector shaft 120 is rotated, in which the assistance steering power provided by the motor 110 is reflected. In response to the rotation of the sector shaft 120, steering power is transferred to the rack via the Pitman arm, the tie-rod, and the like, and the vehicle's wheel rotates following the movement of the rack. The angle sensor 133 is disposed on the sector shaft 120, and the rotation of the sector shaft 120 is associated with the rotation of the vehicle's wheel. Accordingly, the angle of rotation detected by the angle sensor 133 may be the actual angle of rotation of the vehicle's wheel, to which an error that may occur during calculation or transfer of the assistance steering power may be applied.

When the amount of compensation rotation is calculated, the controller 150 may consider gear ratios (e.g. gear ratios between the worm gears and the worm wheel) on a route along which the steering effort applied via the steering wheel and the assistance steering power provided by the motor 110 are transferred. The controller 150 may calculate the amount of compensation rotation of the motor 110 that allows the second amount of rotation of the vehicle's wheel in accordance with the detected angle of rotation to reach the first amount of rotation of the vehicle's wheel in accordance with the detected steering angle. The controller 130 may control the amount of rotation of the motor 110 in accordance with the calculated amount of compensation rotation. Accordingly, it is possible to compensate for an error caused by the first reducer 160, the second reducer 170, and the like, during the steering control.

In an embodiment, when both the first motor 111 and the second motor 113 are being driven, the controller 150 may control currents applied to the first motor 111 and the second motor 113 so that the calculated amount of rotation of the motor 110 satisfies the calculated amount of compensation rotation. Since the first motor 111 and the second motor 113 rotate the single worm wheel, in an embodiment, the controller 150 may control the motor 110 on the basis of the amount of rotation of the worm wheel.

In an embodiment, when one of the first motor 111 and the second motor 113 is being driven, the controller 150 may further apply a compensation current based on the amount of compensation rotation to the motor that is being driven in order to further rotate the motor. Alternatively, a compensation current may be applied to drive the other motor that is not being driven, so that the other motor can rotate by an amount equal to the amount of compensation rotation.

That is, if the angle of rotation, by which the sector shaft is to be rotated with respect to the steering angle of the steering wheel, is not satisfied, the controller 150 may perform an angle overlay operation, i.e. may further rotate the sector shaft in accordance with the calculated amount of compensation rotation by controlling the motor 110. In an embodiment, the controller 150 may perform position control using proportional integral (PI) control. The assistance steering power, provided in response to the motor 110 being further rotated on the basis of the amount of compensation rotation, may be used for position control to further move the rack by further rotating the sector shaft 120 connected to the rack via a Pitman arm.

As described above, it is possible to control the amount of rotation of the vehicle's wheel by controlling the amount of rotation of the motor in accordance with the amount of compensation rotation calculated by comparing the steering angle and the angle of rotation of the sector shaft due to the manipulation of the steering wheel, so that actual intention of the driver in steering is accurately reflected. In addition, it is possible to more accurately control the amount of rotation of the vehicle's wheel by calculating the amount of compensation rotation of the motor it accordance with the actual amount of rotation of the sector shaft using the angle sensor disposed on the sector shaft.

Figure 7:
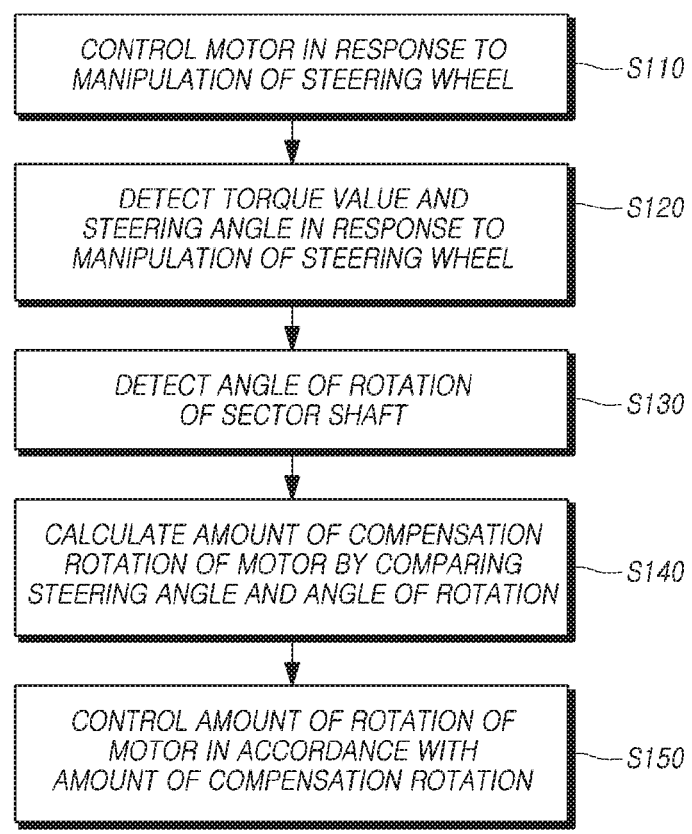
FIG. 7 is a flowchart illustrating a method of controlling the electric power steering apparatus according to the present disclosure.
Figure 8:
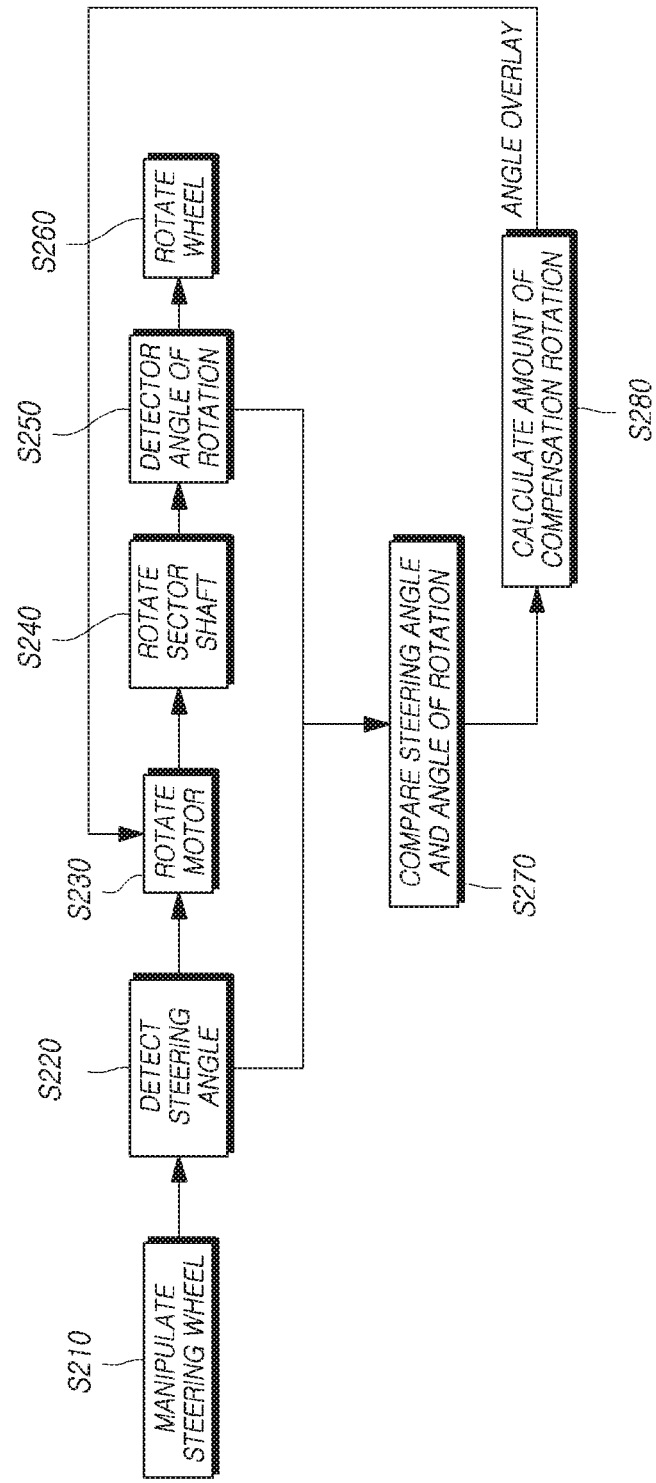
FIG. 8 a flow diagram illustrating a method of controlling the amount of rotation of the motor according to the present disclosure.

FIG. 7 is a flowchart illustrating a method of controlling the electric power steering apparatus according to the present disclosure, and FIG. 8 is a flow diagram illustrating a method of controlling the amount of rotation of the motor according to the present disclosure.

The control method of an electric power steering apparatus according to the present disclosure may be performed by the electric power steering apparatus 100 described above with reference to FIG. 1. Hereinafter, the control method of an electric power steering apparatus according to the present disclosure and the operation of the electric power steering apparatus 100 for realizing the control method will be described in detail with related drawings.

Referring to FIG. 7, the electric power steering apparatus may control the motor in response to the steering wheel being manipulated in S110.

The motor of the electric power steering apparatus may include the first motor and the second motor to provide assistance steering power in response to the steering wheel of the vehicle being manipulated by the driver. The motor may provide the assistance steering power necessary for moving the rack to a position in which the vehicle can be steered as intended by the driver.

When the driver manipulates the steering wheel, the steering angle of the steering wheel is detected, and the motor may be driven, under the control of the controller, to provide the assistance steering power calculated on the basis of the detected steering angle. The controller of the electric power steering apparatus may control currents applied to the first motor and the second motor so that the vehicle wheel is steered by the manipulation of the steering wheel.

Referring to FIG. 7 again, the electric power steering apparatus may detect a torque value and a steering angle due to the manipulation of the steering wheel in S120.

The sensor of the electric power steering apparatus may include the torque angle sensor to detect a torque value and a steering angle in response to the manipulation of the steering wheel. The torque angle sensor may be connected to the steering shaft, in a location between the steering wheel and the first reducer, to detect the torque value and the steering angle, in response to the torsion and rotation of the steering shaft. The torque angle sensor may provide information regarding the torque value and the steering angle, detected as above, to the controller.

Returning to FIG. 7, an angle of rotation of the sector shaft may be detected in S130.

The sensor of the electric power steering apparatus may include the angle sensor detecting the angle of rotation of the sector shaft. The angle sensor may be disposed on the sector shaft, rotating in response to the sliding of the ball nut of the second reducer, to detect the angle of rotation of the sector shaft.

Referring to FIG. 7 again, an amount of compensation rotation of the motor may be calculated by comparing the steering angle and the angle of rotation in S140.

The controller of the electric power steering apparatus may compare the steering angle detected by the torque angle sensor with the amount of rotation of the vehicle's wheel in accordance with the angle of rotation detected by the angle sensor. The controller may calculate the first amount of rotation, by which the vehicle's wheel is to be rotated, in accordance with the detected steering angle. The controller may calculate the second amount of rotation of the vehicle's wheel in accordance with the detected steering angle.

The controller may calculate the amount of compensation rotation of the motor by comparing the first amount of rotation of the vehicle's wheel in accordance with the detected steering angle with the second amount of rotation of the vehicle's wheel in accordance with the detected angle of rotation. The controller may calculate the amount of compensation rotation of the motor, in consideration of a gear ratio on a route along which the steering effort applied via the steering wheel and the assistance steering power provided by the motor are transferred. The amount of compensation rotation of the motor allows the second amount of rotation of the vehicle's wheel in accordance with the detected angle of rotation to reach the first amount of rotation of the vehicle's wheel in accordance with the detected steering angle.

Returning to FIG. 7, the electric power steering apparatus may control the amount of rotation of the motor in accordance with the amount of compensation rotation in S150.

The controller of the electric power steering apparatus may control the amount of rotation of the motor in accordance with the calculated amount of compensation rotation. Accordingly, it is possible to compensate for an error caused by the first reducer, the second reducer, and the like, during steering control.

In an embodiment, when both the first motor and the second motor are being driven, the controller may control currents applied to the first motor and the second motor so that the calculated amount of rotation of the motor satisfies the calculated amount of compensation rotation. Since the first motor and the second motor rotate the single worm wheel, in an embodiment, the controller may control the motor on the basis of the amount of rotation of the worm wheel.

In an embodiment, when one of the first motor and the second motor is being driven, the controller may further apply a compensation current based on the amount of compensation rotation to the motor that is being driven in order to further rotate the motor. Alternatively, a compensation current may be applied to drive the other motor that is not being driven, so that the other motor can rotate by an amount equal to the amount of compensation rotation.

That is, if the angle of rotation, by which the sector shaft is to be rotated with respect to the steering angle of the steering wheel, is not satisfied, the controller may perform an angle overlay operation, i.e. may further rotate the sector shaft in accordance with the calculated amount of compensation rotation by controlling the motor.

More specifically, it is possible to control the amount of rotation of the vehicle's wheel, so that actual intention of the driver in steering is accurately reflected, by controlling the amount of rotation of the motor in accordance with the amount of compensation rotation calculated by comparing the steering angle and the angle of rotation of the sector shaft due to the manipulation of the steering wheel. In addition, it is possible to more accurately control the amount of rotation of the vehicle's wheel by calculating the amount of compensation rotation of the motor in accordance with the actual amount of rotation of the sector shaft using the angle sensor disposed on the sector shaft.

Hereinafter, the calculation of the amount of compensation rotation and the control of the motor according to the present disclosure will be described in more detail with reference to FIG. 8.

Referring to FIG. 8, the driver steers the vehicle by manipulating the steering wheel in S210. Then, as the steering wheel rotates, the torque angle sensor may detect a torque value and a steering angle in S220. The torque angle sensor may be connected to the steering shaft, in a location between the steering wheel and the first reducer, to detect the torque value and the steering angle, in response to the torsion and rotation of the steering shaft.

The controller may rotate the motor in forward or reverse steering by suitably controlling currents supplied to the first motor and the second motor depending on the situation of the vehicle in S230. The controller may control the operation of the motor, so that the electric power steering apparatus may perform an operation of adjusting the steering effort that the driver may detect.

The ball screw rotates in response to the motor being driven, and the ball nut slides in response to the rotation of the ball screw. In response to the sliding of the ball nut, the sector shaft rotates in a predetermined range of angle in S240.

The angle sensor, disposed on the sector shaft, may detect an angle of rotation of the sector shaft in S250. In response to the rotation of the sector shaft, steering power may be transferred to the rack via the Pitman arm, the tie-rod, and the like, connected to the sector shaft, thereby rotating the vehicle's wheel, in S260.

In an embodiment, the sector gear may be provided on the outer circumferential surface of the sector shaft and engaged with the ball nut, and the angle sensor may be disposed on one surface of the sector gear. The angle sensor may include one or more magnets disposed on surface portions of the sector gear and the magnetic sensor detecting the magnetic force of the magnets.

In an embodiment, the magnetic sensor may be disposed on the surface of the housing surrounding the sector shaft and the sector gear to face the magnets. The magnetic sensor may detect the magnetic force of the magnets. In an embodiment, the magnetic sensor may be implemented as a Hall IC sensor. However, this is only an example, and the magnetic sensor is not limited to a specific type of sensor, as long as the magnetic sensor can detect the magnetic force of the magnets.

When the sector shaft rotates in response to the sliding of the ball nut, the magnets disposed on the sector gear rotate along with the sector shaft. In response to the movement of the magnets, the intensity of a magnetic field of each magnet detected by the magnetic sensor changes. The magnetic sensor may detect the angle of rotation of the sector shaft, on the basis of changes in the detected intensity of the magnetic field.

The controller may compare the first amount of rotation of the vehicle's wheel calculated in accordance with the steering angle with the second amount of rotation of the vehicle's wheel calculated in accordance with the angle of rotation in S270. The controller may compare the steering angle detected by the torque angle sensor with the amount of rotation of the vehicle's wheel in accordance with the angle of rotation detected by the angle sensor. The controller may calculate the first amount of rotation, by which the vehicle's wheel is to rotate, in accordance with the detected steering angle. The controller may calculate the second amount of rotation of the vehicle's wheel in accordance with the detected angle rotation.

The controller may calculate the amount of compensation rotation of the motor by comparing the first amount of rotation of the vehicle's wheel in accordance with the detected steering angle with the second amount of rotation in the vehicle's wheel in accordance with the detected angle of rotation in S280. The torque angle sensor may detect the steering angle the steering shaft connected to the steering wheel, due to the rotation. Since the steering angle in response to the steering wheel being rotated by the driver is detected, the steering angle detected by the torque angle sensor may be the angle of rotation of the vehicle's wheel intended by the driver.

As described above, the motor is driven in accordance with the detected steering angle, the sector shaft is rotated, in which the assistance steering power provided by the motor is reflected. In response to the rotation of the sector shaft, steering power is transferred to the rack via the Pitman arm, the tie-rod, and the like, and the vehicle's wheel rotates following the movement of the rack. The angle sensor is disposed on the sector shaft, and the rotation of the sector shaft is associated with the rotation of the vehicle's wheel. Accordingly, the angle of rotation detected by the angle sensor may be the actual angle of rotation of the vehicle's wheel, to which an error that may occur during calculation or transfer of the assistance steering power is applied.

The controller may calculate the amount of compensation rotation of the motor that allows the second amount of rotation of the vehicle's wheel in accordance with the detected angle of rotation to reach the first amount of rotation of the vehicle's wheel in accordance with the detected steering angle. The controller may control the amount of rotation of the motor in accordance with the calculated amount of compensation rotation. This can compensate for an error caused by the first reducer, the second reducer, and the like, during the steering control.

That is, if the angle of rotation, by which the sector shaft is to be rotated with respect to the steering angle of the steering wheel, not satisfied, the controller may perform an angle overlay operation, i.e. may further rotate the sector shaft in accordance with the calculated amount of compensation rotation by controlling the motor. In an embodiment, the controller may perform position control using proportional integral (PI) control. The assistance steering power, provided in response to the motor being further rotated on the basis of the amount of compensation rotation, may be used for position control to further move the rack by further rotating the sector shaft connected to the rack via the Pitman arm.

As described above, it is possible to control the amount of rotation of the vehicle's wheel by controlling the amount of rotation of the motor in accordance with the amount of compensation rotation calculated by comparing the steering angle and the angle of rotation of the sector shaft due to the manipulation of the steering wheel, so that the actual intention of the driver in steering is accurately reflected. In addition, it is possible to more accurately control the amount of rotation of the vehicle's wheel by calculating the amount of compensation rotation of the motor in accordance with the actual amount of rotation of the sector shaft using the angle sensor disposed on the sector shaft.

Figure 9:
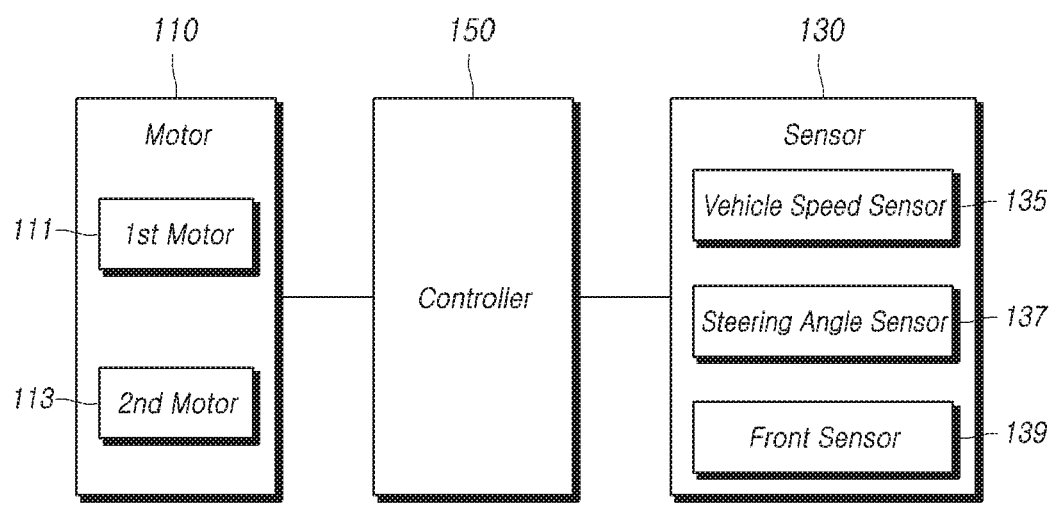
FIG. 9 is a block diagram illustrating an electric power steering apparatus according to another embodiment of the present disclosure.

FIG. 9 is a block diagram illustrating an electric power steering apparatus according to another embodiment of the present disclosure.

Referring to FIG. 9, the electric power steering apparatus 100 according to the present disclosure includes the motor 110, the sensor 130, and the controller 150. The motor 110 includes the first motor 111 providing power to move a rack and the second motor 113 providing power to move the rack in synchronization with the first motor 111. The sensor 130 includes a vehicle speed sensor 135 obtaining a speed of a host vehicle, a steering angle sensor 137 obtaining a steering angular velocity due to the manipulation of the steering wheel, and a front sensor 1 obtaining a distance to a preceding vehicle. The controller 150 controls the operation of the first motor 111 and the operation of the second motor 113 so that the vehicle's wheel is steered in response to the manipulation of the steering wheel. The controller 150 drives the first motor 111 in a normal node and drives both the first motor 111 and the second motor 113 in an emergency mode, on the basis of at least one selected from among the vehicle speed, the steering angular velocity, the distance to a preceding vehicle, or combinations thereof.

The motor 110 may include the first motor 111 and the second motor 113 to provide assistance steering power when a driver manipulates the steering wheel of a vehicle. The first motor 111 may provide assistance steering power necessary for moving the rack to a position in which the vehicle can be steered as intended by the driver. When the driver manipulates the steering wheel, the steering angle of the steering wheel is detected, and the first motor 111 may be driven, under the control of the controller, to provide the assistance steering power calculated on the basis of the detected steering angle.

The second motor 113 may provide assistance steering power necessary for moving the rack to a position in which the vehicle can be steered as intended by the driver. When the driver manipulates the steering wheel, the steering angle of the steering wheel is detected, and the second motor 113 may be driven, under the control of the controller, to provide the assistance steering power calculated on the basis of the detected steering angle.

In an embodiment, the second motor 113 may be driven in synchronization with the first motor 111. The first motor 111 and the second motor 113 may output power to rotate a single worm wheel in the electric power steering apparatus 100. Thus, the first motor 111 and the second motor 113 may operate in synchronization with each other.

In addition, one of the first motor 111 and the second motor 113 may selectively be operated. In addition, the first motor 111 and the second motor 113 may rotate in the same direction or in different directions.

The sensor 130 may include the vehicle speed sensor 135 obtaining the speed of the host vehicle, the steering angle sensor 137 obtaining the steering angular velocity due to the manipulation of the steering wheel, and the front sensor 139 obtaining the distance to a preceding vehicle.

The vehicle speed sensor 135 may be disposed on the output shaft of a transmission to detect the vehicle speed by detecting the number of revolutions of the transmission. Information regarding the vehicle speed, detected by the vehicle speed sensor 135, may be provided to the controller 150.

The steering angle sensor 137 may output the steering angle by detecting the angle of rotation of the steering wheel, and the output value of the steering angle may be provided to the controller 150.

The front sensor 139 may be implemented as a radar, a camera, or the like, to detect a preceding vehicle traveling in front of the host vehicle and obtain the distance to the preceding vehicle. Information regarding the obtained distance may be provided to the controller 150.

Although not shown in FIG. 9, in an embodiment, the sensor 130 may further include the angle sensor 133 detecting the angle of rotation of the sector shaft, illustrated in FIGS. 1 and 2, a first sensor locating the center of rotation of the steering wheel, a second sensor locating an area of the steering wheel held by the driver, and the like.

The controller 150 may control the overall operation of the electric power steering apparatus 100. In an embodiment, the controller 150 may be implemented as a microcontroller unit (MCU) or an electric control unit (EC). The controller 150 may control the first motor 111 and the second motor 113 by synchronizing the first motor 111 and the second motor 113 with each other. The controller 150 may receive status information of the first motor 111 and the second motor 113 via a controller area network (CAN). The controller 150 may control currents applied to the first motor 111 and the second motor 113 so that the vehicle's wheel is steered in response to the manipulation of the steering wheel.

The controller 150 may receive information regarding the vehicle speed, the steering angular velocity, or the distance to a preceding vehicle from the sensors, determine the traveling state of the host vehicle on the basis of the received information, and select a driving mode of the motor 110. The driving mode may be categorized as the normal mode and the emergency mode. However, such categorization of the modes is for the sake of brevity, and the present disclosure is not limited thereto.

If the current situation is determined to be a normal situation in which assistance steering power required by the steering of the driver may be sufficiently provided by a single motor, the controller 150 may control the motor 110 in the normal mode. In this case, the controller 150 may control the motor 110 so that the assistance steering power is only provided by the first motor 111 in a predetermined manner. That is, the controller 150 may perform torque control to adjust the steering effort of the driver by driving the first motor 111.

If it is determined that rapid steering is necessary as in a situation in which a frontward obstacle, such as a preceding vehicle, must be rapidly evaded, the controller 150 may control the motor 110 in the emergency mode. In this case, the controller 150 may further drive the second motor 113, in addition to the first motor 111 that is being driven, to provide an additionally-required amount of assistance steering power. That is, the controller 150 may perform an angle overlay operation, i.e. may calculate a ratio of the sector shaft to be rotated with respect to the steering angle of the steering shaft and further rotate the sector shaft in accordance with the calculated ratio by driving the second motor 113.

In an embodiment, the controller 150 may reduce assistance torque output by the first motor 111 in order to prevent the steering effort from being light or rapid while position control is being performed in the emergency mode. Since the rotation of the sector shaft in response to the driving of the second motor 113 causes the steering wheel to rotate further, the controller 150 may control the first motor 111 to reduce the output of the assistance torque by an amount equal to an amount by which the steering effort is light due to the driving of the second motor 113.

In another embodiment, in a situation in which the sensor 130 further includes the angle sensor 133 obtaining the angle of rotation of the sector shaft, the controller 150 may calculate the amount of compensation rotation of the motor 110, on the basis of the steering angle of the steering wheel and the angle of rotation of the sector shaft, and control the amount of rotation of the motor 110, in accordance with the amount of compensation rotation, in the emergency mode.

In addition, the electric power steering apparatus 100 according to the present disclosure, illustrated in FIG. 9, may perform an operation, as described above with reference to FIG. 2, and have an engagement structure of the worm gears 161 and 162 and the worm wheel 163, as described above with reference to FIG. 3.

As described above, it is possible to provide a suitable amount of assistance steering power depending on the situation by selectively controlling dual motors provided in the electric power steering apparatus depending on the driving situation of the vehicle. Hereinafter, the control method of the electric power steering apparatus will be described in more detail with reference to the related drawings.

FIGS. 10 to 14 are graphs illustrating the control over the dual motors of the electric power steering apparatus according to another embodiment of the present disclosure.

The controller 150 may efficiently supply assistance steering power in forward or reverse steering by suitably controlling currents supplied to the first motor 111 and the second motor 113 depending on the situation of the vehicle. Hereinafter, control operations of the controller 150, performed to drive the first motor 111 and the second motor 113 in a variety of situations, will be described with reference to the related drawings.

In an embodiment, in a normal situation in which assistance steering power required for the steering of the vehicle may be provided by one of the dual motors provided in the electric power steering apparatus, the controller 150 may control the driving of the motor 110 in the normal mode. In this case, the controller 130 may control the driving of the first motor 111, so that the electric power steering apparatus 100 performs the operation of adjusting the steering effort that the driver detects.

Figure 10:
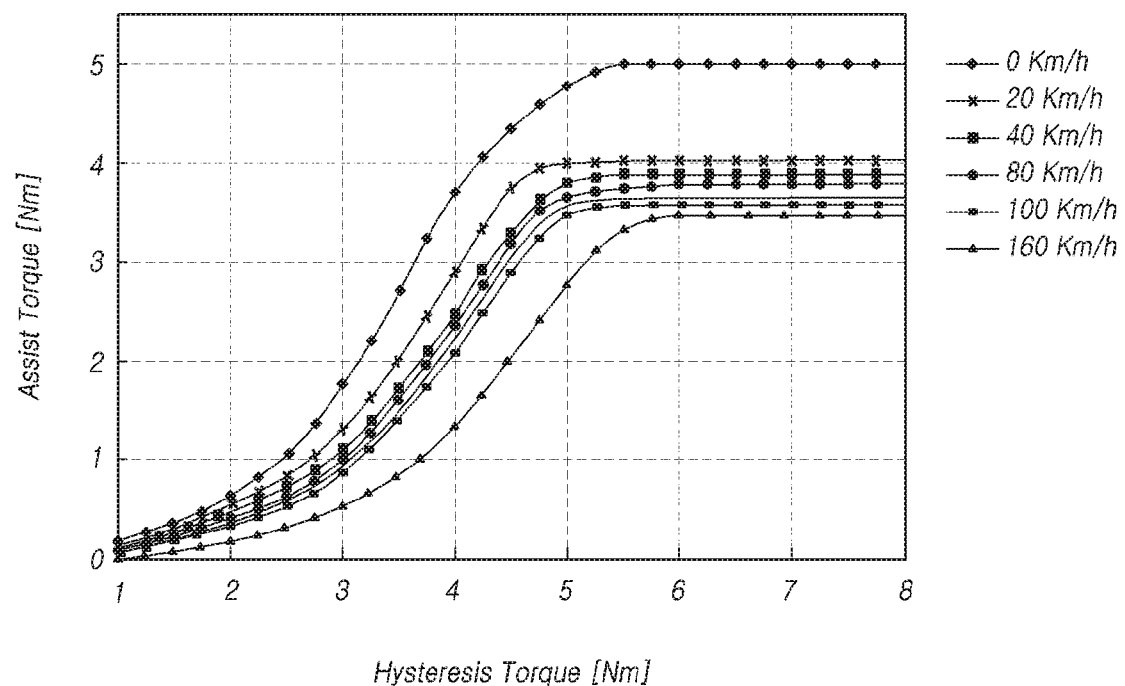

For example, the controller 150 may control the driving of the first motor 111 in accordance with the information regarding the vehicle speed detected by the speed sensor. Referring to FIG. 10, the assistance torques, which the first motor 111 provides in accordance with the vehicle speed in the normal mode according to an embodiment, are illustrated in the graph. As illustrated in FIG. 10, with increases in the vehicle speed, the controller 150 may change the steering effort to be obtuse by reducing the amount of assistance torque provided by the first motor 111. In contrast, with decreases in the vehicle speed, the controller 150 may change the steering effort to be light by increasing the amount of assistance torque provided by the first motor 111.

Figure 11:
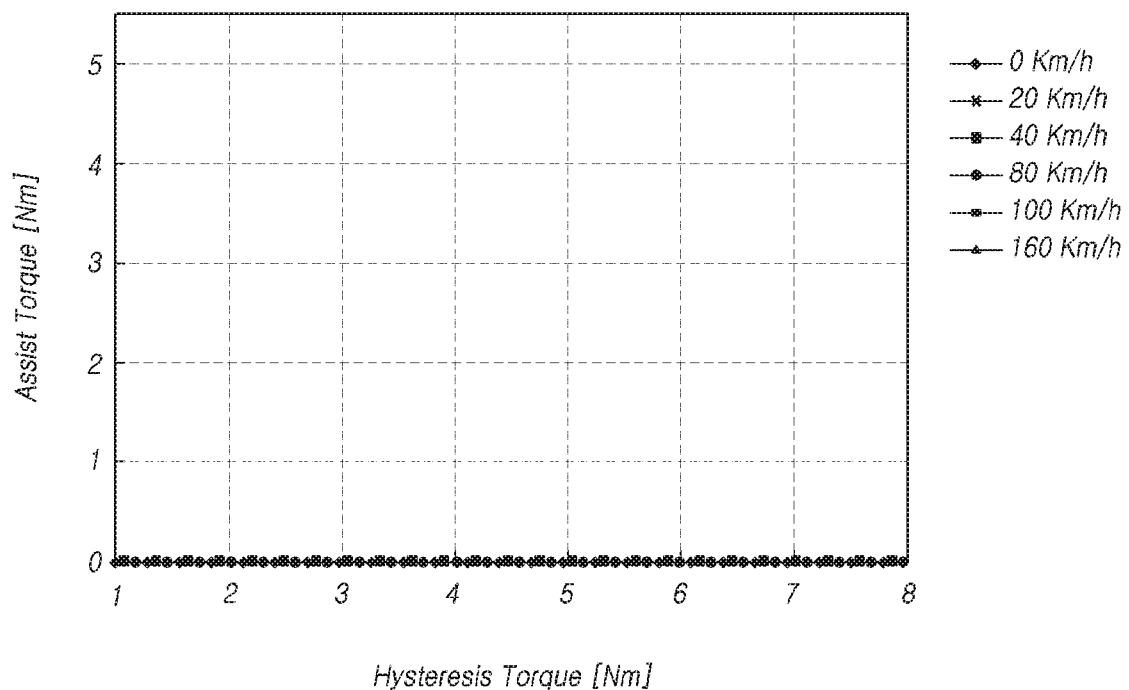

In an embodiment, in the normal mode, the controller 150 may control the second motor 113 not to output the assistance torque. That is, the torque control for adjusting the steering effort for the driver may only be performed by the first motor 111. Referring to FIG. 11, the assistance torques, which the first motor 111 provides in accordance with the vehicle speed in the normal mode according to an embodiment, are illustrated in the graph. As illustrated in FIG. 11, the controller 150 may control the second motor 113 not to output the assistance torque, regardless of the vehicle speed.

In an embodiment, when additional assistance steering power is required in addition to the assistance steering power provided in the normal mode during the steering of the vehicle, the controller 150 may control the driving of the motor 110 in the emergency mode. In an embodiment, if the speed of the host vehicle is a predetermined speed (e.g. 100 KPH (km/h)) or higher, the steering angular velocity due to the manipulation of the driver is a predetermined rate (e.g. 540 deg/s) or higher, and the distance to a detected preceding vehicle is a predetermined distance (e.g. 50 m) or less, the controller 150 may determine to enter the emergency mode. However, this is merely an example, and the present disclosure is not limited thereto. Such reference values may be set to be different as required.

Of the above-described conditions are satisfied, the controller 150 may determine that the host vehicle must perform evasive braking, lane changing, or the like, in the current situation, and may operate in the emergency mode. The controller 150 may control the driving of the second motor 113 to provide the assistance steering power to perform additional steering.

The assistance steering power, provided to the second motor 113 in the emergency mode, may be used for position control to further move the rack by further rotating the sector shaft 120 connected to the rack via the Pitman arm, as illustrated in FIG. 2. In this regard, the sensor 130 may further include the angle sensor 133 disposed on the sector shaft 120, rotating in response to the sliding of the ball nut 172, to detect the angle of rotation of the sector shaft 120, as illustrated in FIG. 2.

The controller 150 may receive information regarding the steering angle of the steering wheel 180 from the steering angle sensor 137. In addition, the controller 150 may receive information regarding the angle of rotation of the sector shaft 120 from the angle sensor 133. The controller 150 may calculate additional assistance steering power required in the emergency mode using a difference between the steering angle of the steering wheel 180 and the angle of rotation of the sector shaft 120.

Figure 12:
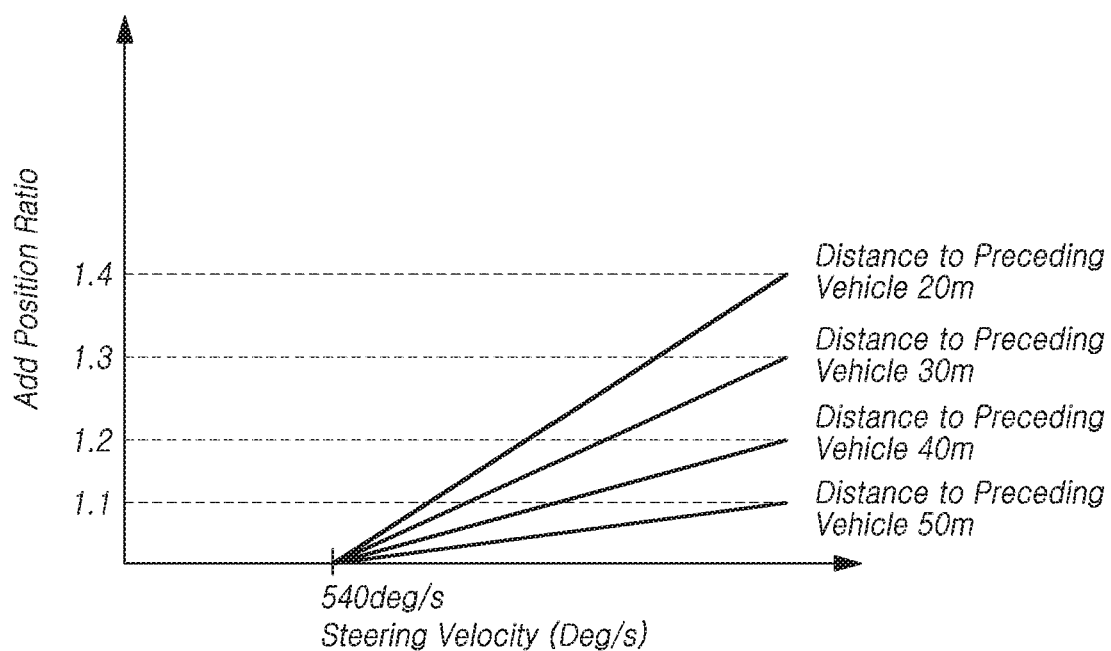

In this case, a ratio at which the sector shaft must rotate with respect to the steering angle, i.e. an add position ratio (APR), may be previously set in accordance with the distance to a preceding vehicle. Referring to FIG. 12, APRs regarding the rotation of the sector shaft, driven by the second motor 113, according to an embodiment, are illustrated. As illustrated in FIG. 12, angular velocities less than 540 deg/s may be set as a dead zone in which the second motor 113 is not driven. This is intended to exclude frequent additional steering and perform additional steering only in emergency situations in conditions of which steering by the driver is rapid.

Here, the APR applied as 1.4, on the basis of a traveling situation of the host vehicle, indicates that the sector shaft 120 must be rotated 1.4 times, compared to the case in which the APR is 1.0. For example, it is assumed that the sector shaft rotates 10° when the steering wheel is rotated 90° when the APR is 1.0 (i.e. in the normal mode). In this case, if the APR is 1.4, the sector shaft must rotate 14° when the steering wheel is rotated 90°.

Accordingly, the controller 150 may calculate an amount of rotation of the second motor 113 by which the sector shaft is rotated 4°. The controller 150 may calculate a reference position by converting the additional amount of rotation of the sector shaft into the amount of rotation of the second motor 113. For example, the controller 150 may calculate an amount of position control regarding the second motor 113 using PI control, on the basis of the current position of the second motor 113 and the reference position. However, this is only an example, and the present disclosure is not limited to a specific method, as long as the amount of position control can be calculated.

The controller 150 may control the second motor 113 to provide additional assistance steering power regarding the calculated amount of position control. Accordingly, when the steering wheel is manipulated rapidly in an emergency, the driver can obtain additional assistance rotation, in addition to assistance rotation provided in the normal mode. As described above, in a situation in which rapid lane changing is required depending on the traveling state of the vehicle, required assistance steering power may be provided by driving both the dual motors. Accordingly, in an emergency, lane changing or evasive braking can be performed more rapidly in large commercial vehicles, rapid steering of which has been difficult in the related art.

In an embodiment, the controller 150 may control the driving of the first motor 111 to prevent the steering effort on the driver from being changed due to additional steering performed by the second motor 113. As illustrated in FIGS. 2 and 3, the first motor 111 and the second motor 113 are connected to the first worm gear 161 and the second worm gear 162, respectively, to rotate the single worm wheel 163, so that the steering effort may be changed due to the driving of the second motor 113.

In this regard, the controller 150 may reduce the assistance torque provided by the first motor 111, in accordance with an amount of current generated for the second motor 113 to provide additional steering, thereby reducing or preventing changes in the steering effort. Accordingly, even in the case of additional steering in the emergency mode, the driver may manipulate the steering wheel with substantially the same steering effort.

According to an embodiment of the present disclosure, in the above-described emergency mode, the controller 150 may control the driving of at least one of the first motor 111, the second motor 113, or a combination thereof, to increase assistance steering power with increases in the vehicle speed, increases in the steering angular velocity, and decreases in the distance to a preceding vehicle.

The controller 150 may receive information regarding the vehicle speed, the steering angular velocity, or the distance to a preceding vehicle from the sensors, determine the traveling state of the host vehicle on the basis of the received information, and determine whether or not to enter the emergency mode. If it is determined that rapid steering is necessary as in a situation in which a frontward obstacle, such as a preceding vehicle, must be rapidly evaded, the controller 150 may control the motor 110 in the emergency mode.

The higher the speed of the host vehicle is, the greater the necessity for rapid steering to a greater angle may be. In addition, the higher the steering angular velocity due to the steering of the driver is, the more emergent the situation may be. In addition, the shorter the distance to a preceding vehicle is, the more rapid the steering is required. Accordingly, with increases in the necessity of the rapid steering, the controller 150 may increase the assistance steering power output by the motor 110, so that the vehicle's wheel may be more rotated by the same amount of manipulation of the driver.

Referring to FIG. 13, output values of the motor 110 in accordance with the vehicle speed, the distance to a preceding vehicle, and the steering angular velocity according to an embodiment are shown. At the vehicle speed not exceeding 40 km/h, the controller 150 may drive the first motor 111 in the normal mode, irrespective of the distance to a preceding vehicle or the steering angular velocity, as illustrated in FIG. 10. In addition, at the distance to a preceding vehicle being equal to or greater than 50 m, the controller 150 may drive the first motor 111 in the normal mode, irrespective of the vehicle speed or the steering angular velocity. In addition, at the steering angular velocity not exceeding 180 deg/s, the controller 150 may drive the first motor 111 in the normal mode, irrespective of the vehicle speed or the distance to a preceding vehicle. The above-described three cases may correspond to a situation in which additional power output is unnecessary, since evasion or lane changing may be enabled by the assistance steering power provided in the normal mode.

Returning to FIG. 13, at the speed of the host vehicle exceeding 40 km/h and not exceeding 80 km/h, the distance to a preceding vehicle being from 30 m and less than 50 m, and the steering angular velocity being equal to or greater than 360 deg/s and less than 720 deg/s, the controller 150 may control a current supplied to the motor 110, so that power output by the motor 110 is 105%.

Likewise, at the speed of the host vehicle exceeding 40 km/h and not exceeding 80 km/h, the distance to a preceding vehicle being from 30 m and less than 50 m, and the steering angular velocity exceeding 720 deg/s, the controller 150 may control a current supplied to the motor 110, so that power output by the motor 110 is 110%.

It may be appreciated, in other conditions, that the higher the vehicle speed is, the smaller the distance to a preceding vehicle is, and the greater the steering angular velocity is, the greater the output power of the motor 110 may be. However, the conditions shown in FIG. 13 are only an example, and the present disclosure is not limited thereto. Conditions by which output in the emergency mode is controlled may be set variously, as required. In addition, in an embodiment, variables of the vehicle speed, the distance to a preceding vehicle, and the steering angular velocity may be estimated by three-dimensional (3D) interpolation.

Figure 14:
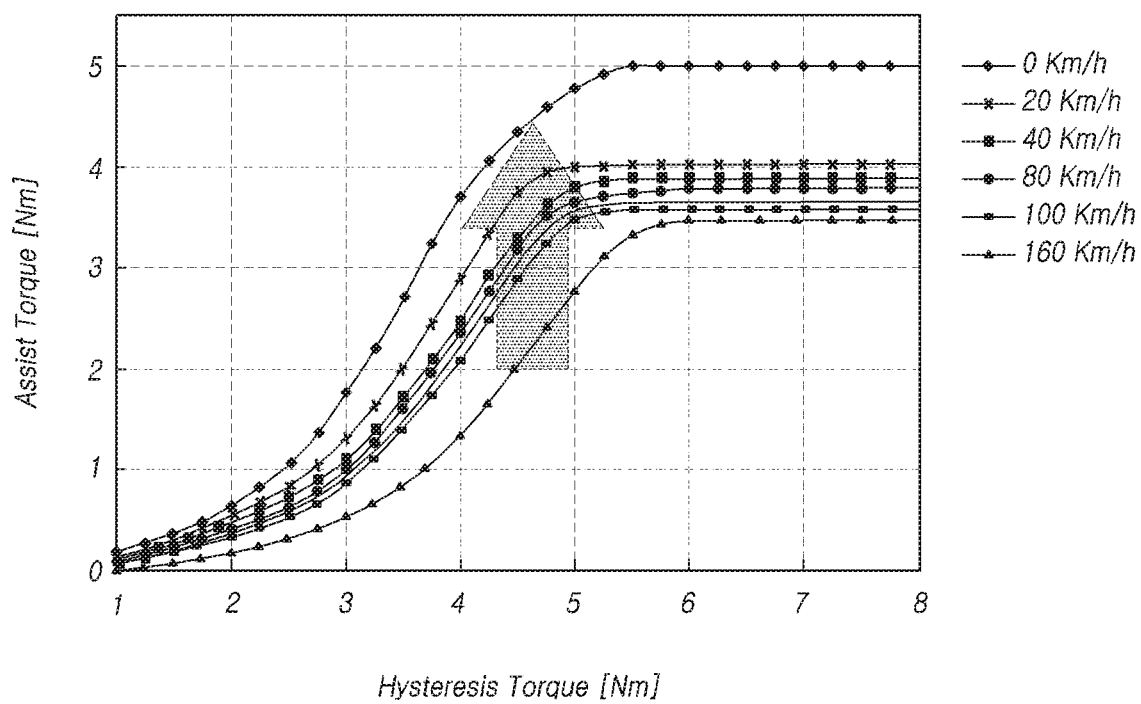

In an embodiment, the controller 150 may increase output by increasing a current supplied to the first motor 111. For example, as illustrated in FIG. 14, the controller 150 may increase the assistance torque provided by the first motor 111 at ratios determined in accordance with vehicle speeds. Accordingly, the graph of the assistance torque provided by the first motor 111 gradually increases.

Alternatively, in another embodiment, the controller 150 may increase the output by supplying a current to the second motor 113. In this case, the controller 150 may control the first motor 111 and the second motor 113, so that a total of outputs from the first motor 111 and the second motor 113 increases at the ratios determined in accordance with vehicle speeds.

As described above, it is possible to provide an amount of assistance steering power suitable to the situation by selectively controlling the dual motors provided in the electric power steering apparatus depending on the traveling state of the vehicle. In addition, in a situation in which rapid lane changing is required depending on the traveling state of the vehicle, it is possible to provide a required amount of assistance steering power by driving both the dual motors, so that a large commercial vehicle can more rapidly change lanes.

FIGS. 15 to 18 are diagrams illustrating the control over the dual motors depending on the center of rotation of the steering wheel according to another embodiment of the present disclosure.

Figure 15:
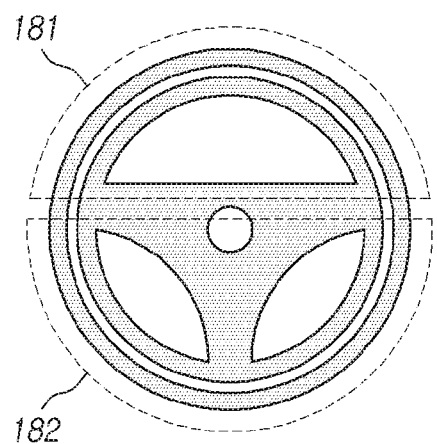
FIGS. 15 to 18 are diagrams illustrating the control over the dual motors depending on the center of rotation of the steering wheel according to another embodiment of the present disclosure.

Referring to FIG. 15, the steering wheel 180 may be divided into a top area 181 and a bottom area 182 of the rim, for the sake of brevity. In general, the steering wheel 180 may be mounted to rotate about the center. In an embodiment, the steering wheel 180 may be configured such that the center of rotation thereof is movable in the top-bottom direction about the center of the steering wheel. The movement of the center of rotation of the steering wheel 180 may be performed by a specific manipulation of the driver or under the control of an electric control unit (ECU).

The sensor 130 may further include a first sensor obtaining position information regarding the center of rotation of the steering wheel 180. If the center of rotation of the steering wheel 180 moves, the first sensor may detect a position, to which the center of rotation has moved, and output information regarding the position to the controller 150.

The sensor 130 may further include a second sensor obtaining information an area of the steering wheel 180 held by the driver. The second sensor is implemented as a pressure sensor to detect the driver holding the top area 181 or the bottom area 182 of the rim and output information regarding the area held by the driver to the controller 150. However, this is only an example, the present disclosure is not limited to the pressure sensor. The second sensor is not limited to a specific sensor, as long as the information regarding the area held by the driver can be obtained.

According to an embodiment the present disclosure, the controller 150 may receive information regarding the vehicle speed, the center of rotation, and the area held by the driver from the sensor 130. The controller 150 may control the driving of the first motor 111 and the second motor 113, on the basis of the received information.

Figure 16:
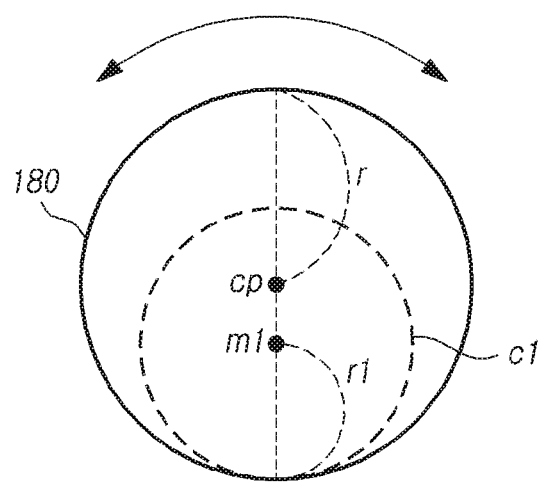

As illustrated in FIG. 16, the center of rotation m1 of the steering wheel 180 has moved downward about the center cp of the steering wheel 180. The radius of the steering wheel 180 is r.

When the driver has held the top area 181 of the rim, the steering wheel 180 is rotated about the center of rotation m1, at a curvature of a greater circle having a radius 2r−r1, the steering effort is light. Accordingly, in a situation in which the host vehicle is traveling at high speed, the controller 150 may control the motor 110 to provide a reduced amount of assistance steering power.

Figure 18:
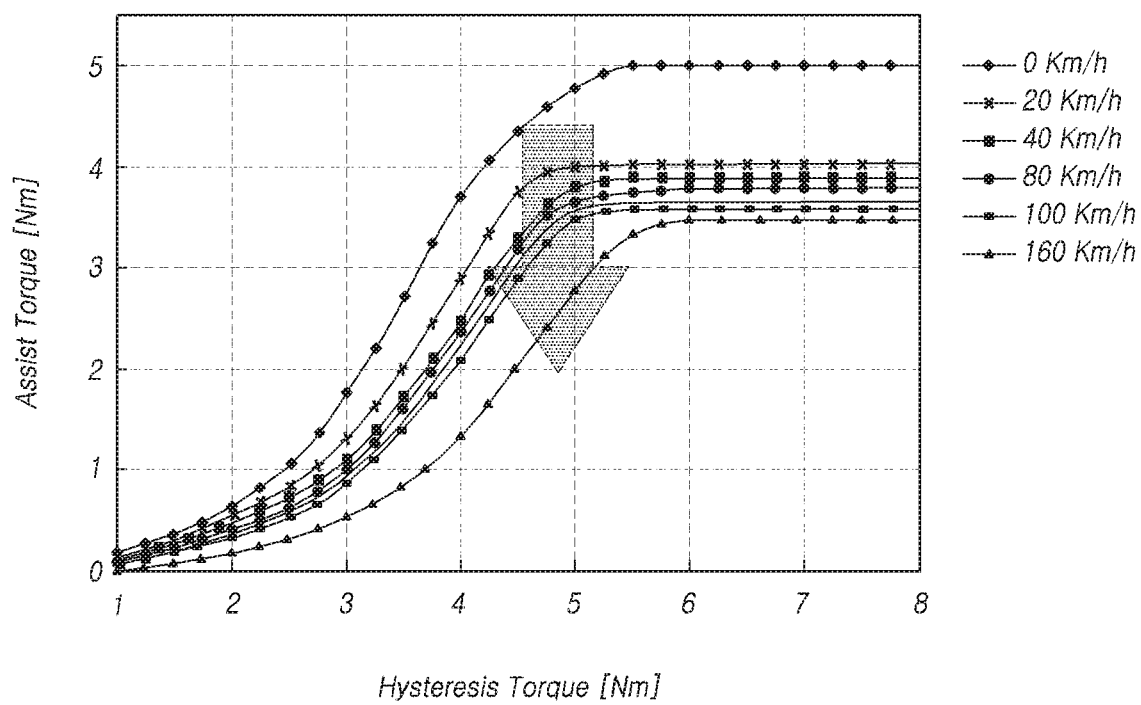

For example, a normal mode in which the first motor 111 is driven may be considered. As illustrated in FIG. 18, the controller 150 may reduce the assistance torque provided by the first motor 111 at ratios determined in accordance with respective vehicle speeds. Accordingly, the entire graph of the assistance torque provided by the first motor 111 may be lowered.

In an emergency mode in which both the first motor 111 and the second motor 113 are driven, the controller 150 may reduce the amount of assistance torque provided by the second. motor 113. Alternatively, the controller 150 may reduce the overall amount of assistance torque provided by the first motor 111 and the second motor 113.

When the driver has held the bottom area 182 of the rim, the steering wheel 180 is rotated about the center of rotation m1, at a curvature of a smaller circle c1 having a radius r1 the steering effort is obtuse. Accordingly, in a situation in which the assistance steering power is to be generally reduced as in the case of high-speed traveling of the host vehicle, the controller 150 may control the motor 110 so that the assistance steering power provided by the motor 110 is maintained.

Figure 17:
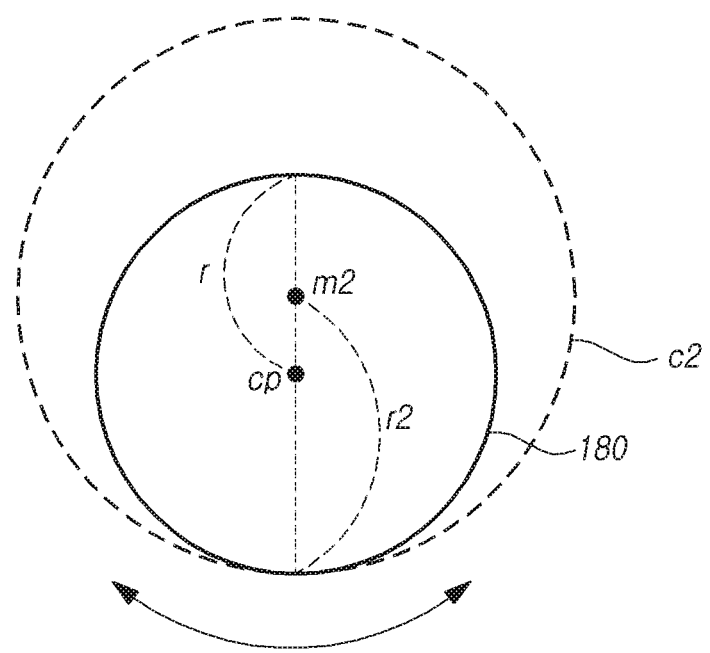

As illustrated in FIG. 17, the center of rotation m2 of the steering wheel 180 has moved upward about the center cp of the steering wheel 180. The radius of the steering wheel 180 is r.

When the driver has held the top area 181 of the rim, the steering wheel 180 is rotated about the center of rotation m2, at a curvature of a smaller circle having a radius 2r−r2, the steering wheel 180 is obtuse. Accordingly, in a situation in which the assistance steering power is to be generally reduced as in the case of high-speed traveling of the host vehicle, the controller 150 may control the motor 110 so that the assistance steering power provided by the motor 110 is maintained.

When the driver has held the bottom area 182 of the rim, the steering wheel 180 is rotated about the center of rotation m2, at a curvature of a greater circle c1 having a radius r2, the steering effort is light. Accordingly, in a situation in which the host vehicle traveling at high speed, the controller 150 may control the motor 110 to provide a reduced amount of assistance steering power.

For example, a normal mode in which the first motor 111 is driven may be considered. As illustrated in FIG. 18, the controller 150 may reduce the assistance torque provided by the first motor 111 at ratios determined in accordance with respective vehicle speeds. Accordingly, the entire graph of the assistance torque provided by the first motor 111 may be lowered.

In an emergency mode in which both the first motor 111 and the second motor 113 are driven, the controller 150 may reduce the amount of assistance torque provided by the second motor 113. Alternatively, the controller 150 may reduce the overall amount of assistance torque provided by the first motor 111 and the second motor 113.

As described above, it is possible to control the amount of assistance steering power provided according to the mounting position of the steering wheel by controlling the dual motors provided in the electric power steering apparatus depending on the center of rotation of the steering wheel and the area held by the driver.

Figure 19:
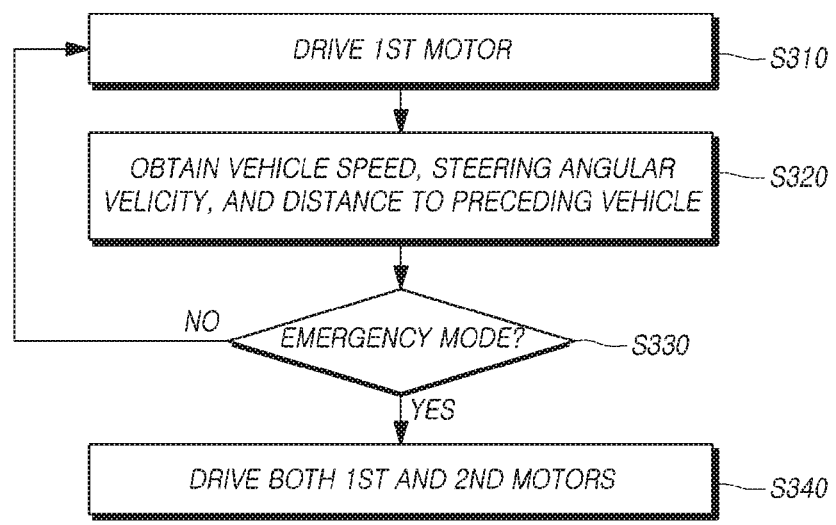
FIG. 19 is a flowchart illustrating a control method of an electric power steering apparatus according to another embodiment of the present disclosure.
Figure 20:
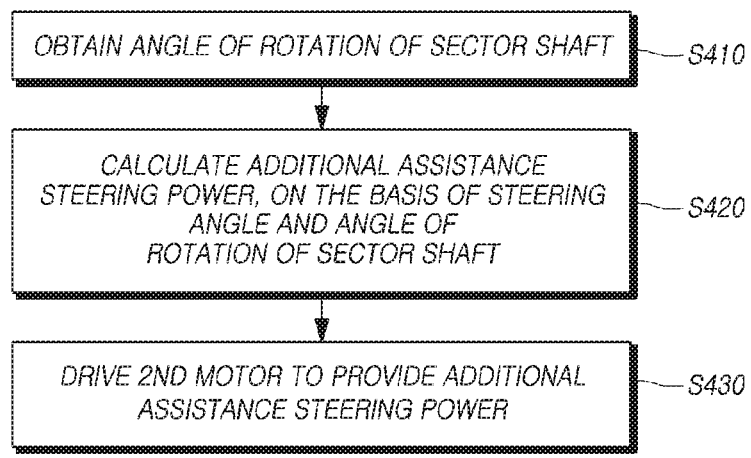
FIG. 20 is a flowchart illustrating a method of calculating required additional assistance steering power according to the other embodiment of the present disclosure.

FIG. 19 is a flowchart illustrating a control method of an electric power steering apparatus according to another embodiment of the present disclosure, and FIG. 20 is a flowchart illustrating a method of calculating required additional assistance steering power according to the other embodiment of the present disclosure.

The control method an electric power steering apparatus according to the present disclosure may be realized using the electric power steering apparatus 100 as described above with reference to FIG. 9. Hereinafter, the control method of an electric power steering apparatus according to the present disclosure and the operation of the electric power steering apparatus 100 for realizing the control method will be described in detail with reference to the related drawings.

Referring to FIG. 19, the electric power steering apparatus may drive the first motor providing power to move the rack in a normal mode, so that the vehicle's wheel is steered in response to the manipulation of the steering wheel, in S310.

The first motor 111 of the electric power steering apparatus may provide assistance steering power necessary for moving the rack to a position in which the vehicle can be steered as intended by the driver. When the driver manipulates the steering wheel, the steering angle of the steering wheel is detected, and the first motor 111 may be driven, under the control of the controller, to provide the assistance steering power calculated on the basis of the detected steering angle.

The normal mode may be an operation mode in a situation in which a single motor may provide a sufficient amount of assistance steering power required due to the steering of the driver. In this case, the controller 150 may control the motor 110 so that the assistance steering power is only provided by the first motor 111 in a predetermined manner. That is, the controller 150 may perform torque control to adjust the steering effort of the driver by driving the first motor 111.

Returning to FIG. 19, the electric power steering apparatus may obtain the speed of the host vehicle, the steering angular velocity due to the manipulation of the steering wheel, and the distance to a preceding vehicle in S320.

The sensor 130 of the electric power steering apparatus may include the vehicle speed sensor 135 obtaining a speed of a host vehicle, the steering angle sensor 137 obtaining a steering angular velocity due to the manipulation of the steering wheel, and the front sensor 139 obtaining a distance to a preceding vehicle.

The vehicle speed sensor 135 may be disposed on the output shaft of a transmission to detect the vehicle speed by detecting the number of revolutions of the transmission. Information regarding the vehicle speed, detected by the vehicle speed sensor 135, may be provided to the controller 150.

The steering angle sensor 137 may output the steering angle by detecting the angle of rotation of the steering wheel, and the output value of the steering angle may be provided to the controller 150.

The front sensor 139 may be implemented as a radar, a camera, or the like, to detect a preceding vehicle traveling in front of the host vehicle and obtain the distance to the preceding vehicle. Information regarding the obtained distance may be provided to the controller 150.

Returning to FIG. 19, the electric power steering apparatus may determine whether or not to enter the emergency mode, on the basis of at least one selected from among the vehicle speed, the steering angular velocity, the distance to a preceding vehicle, or combinations thereof.

The controller 150 may receive information regarding the vehicle speed, the steering angular velocity, or the distance to a preceding vehicle from the sensors, determine the traveling state of the host vehicle on the basis of the received information, and determine whether or not to enter the emergency mode. For example, if it is determined that rapid steering is necessary as in a situation in which a frontward obstacle, such as a preceding vehicle, must be rapidly evaded, the controller 150 may determine to enter the emergency mode.

Referring to FIG. 19 again, if it is determined to enter the emergency mode, both the first motor and the second motor may be driven in the emergency mode in S340.

In the emergency mode, the controller 150 of the electric power steering apparatus may further drive the second motor 113, in addition to the first motor 111 that is being driven, to provide an additionally-required amount of assistance steering power. That is, the controller 150 may perform an angle overlay operation, i.e. may calculate a ratio of the sector shaft to be rotated with respect to the steering angle of the steering shaft and further rotate the sector shaft in accordance with the calculated ratio by driving the second motor 113.

Referring to FIG. 20, the electric power steering apparatus may obtain the angle of rotation of the sector shaft in S410.

The assistance steering power, provided to the second motor 113 in the emergency mode, may be used for position control to further move the rack by further rotating the sector shaft 120 connected to the rack via the Pitman arm. In this regard, the sensor 130 may further include the angle sensor 133 disposed on the sector shaft 120, rotating in response to the sliding of the ball nut 172, to detect the angle of rotation of the sector shaft 120. The controller 150 may obtain information regarding the detected angle of rotation from the angle sensor 133.

Returning to FIG. 20, the electric power steering apparatus may calculate additional assistance steering power on the basis of the steering angle and the angle of rotation of the sector shaft in S420.

The controller 150 may receive information regarding the steering angle of the steering wheel 180 from the steering angle sensor 137. In addition, the controller 150 may receive information regarding the angle of rotation of the sector shaft 120 from the angle sensor 133. The controller 150 may calculate additional assistance steering power required in the emergency mode using a difference between the steering angle of the steering wheel 180 and the angle of rotation of the sector shaft 120.

In this case, a ratio at which the sector shaft must rotate with respect to the steering angle, i.e. an add position ratio (APR), may be previously set in accordance with the distance to a preceding vehicle. In an embodiment, angular velocities less than 540 deg/s may be set as a dead zone in which the second motor 113 is not driven. This is intended to exclude frequent additional steering and perform additional steering only in emergency situations in conditions of which steering by the driver is rapid.

For example, the APR applied as 1.4, on the basis of a traveling situation of the host vehicle, indicates that the sector shaft 120 must be rotated 1.4 times, compared to the case in which the APR is 1.0. It may be assumed that the sector shaft rotates 10° when the steering wheel is rotated 90° when the APR is 1.0 (i.e. in the normal mode). In this case, if the APR is 1.4, the sector shaft must rotate 14° when the steering wheel is rotated 90°.

Accordingly, the controller 150 may calculate an amount of rotation of the second motor 113 by which the sector shaft is rotated 4°. The controller 150 may calculate a reference position by converting the additional amount of rotation of the sector shaft into the amount of rotation of the second motor 113. For example, the controller 150 may calculate an amount of position control regarding the second motor 113 using PI control, on the basis of the current position of the second motor 113 and the reference position. However, this is only an example, and the present disclosure is not limited to a specific method, as long as the amount of position control can be calculated.

Referring to FIG. 20 again, the electric power steering apparatus may drive the second motor to provide additional assistance steering power in S430.

The controller 150 may control the second motor 113 to provide additional assistance steering power regarding the calculated amount of position control. Accordingly, when the steering wheel is manipulated rapidly in an emergency, the driver can obtain additional assistance rotation, in addition to assistance rotation provided in the normal mode. In a situation in which rapid lane changing is required depending on the traveling state of the vehicle, required assistance steering power may be provided by driving both the dual motors. Accordingly, in an emergency, lane changing or evasive braking can be performed more rapidly in large commercial vehicles, rapid steering of which has been difficult in the related art.

In an embodiment, the controller 150 may control the driving of the first motor 111 to prevent the steering effort on the driver from being changed due to additional steering performed by the second motor 113. The first motor 111 and the second motor 113 may be connected to the first worm gear 161 and the second worm gear 162, respectively, to rotate the single worm wheel 163, so that the steering effort may be changed due to the driving of the second motor 113.

In this regard, the controller 150 may reduce the amount of assistance torque provided by the first motor 111, in accordance with an amount of current generated for the second motor 113 to provide additional steering, thereby reducing or preventing changes in the steering effort. Accordingly, even in the case of additional steering in the emergency mode, the driver may manipulate the steering wheel with substantially the same steering effort.

As described above, it is possible to provide a suitable amount of assistance steering power depending on the situation by selectively controlling the dual motors provided in the electric power steering apparatus depending on the driving situation of the vehicle. In addition, in a situation in which rapid lane changing is required depending on the traveling state of the vehicle, required assistance steering power may be provided by driving both the dual motors, so that lane changing or evasive braking can be performed more rapidly in large commercial vehicles in an emergency.

Figure 21:
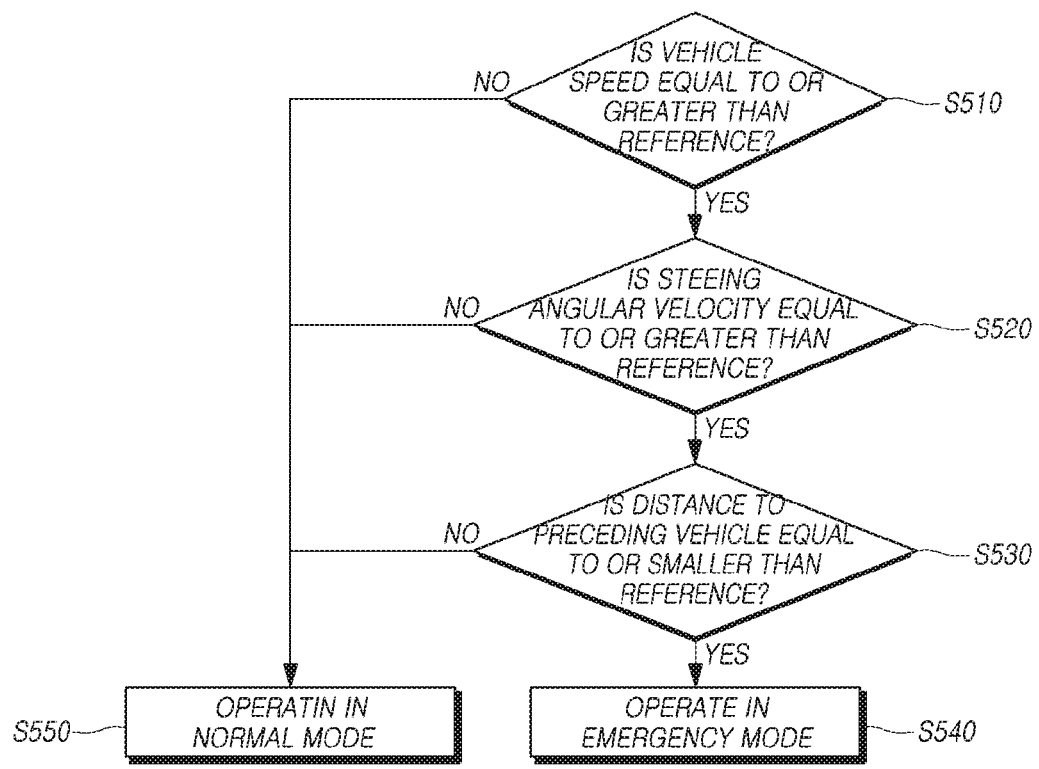
FIG. 21 is a flowchart illustrating a method of determining an operation mode of the electric power steering apparatus according to the present disclosure.

FIG. 21 is a flowchart illustrating a method of determining an operation mode of the electric power steering apparatus according to the present disclosure.

Referring to FIG. 21, the electric power steering apparatus may determine whether or not the speed of the host vehicle is equal to or greater than a predetermined reference value in S510, determine whether or not the steering angular velocity is equal to or greater than a predetermined reference value in S520, and determine whether or not the distance to a preceding vehicle is equal to or greater than a predetermined reference value in S530.

At the vehicle speed not exceeding 40 km/h, as indicated by NO in S510, the controller 150 may drive the first motor 111 in the normal mode, irrespective of the distance to a preceding vehicle or the steering angular velocity, in S550. In addition, at the distance to a preceding vehicle being equal to or greater than 50 m, as indicated by NO in S520, the controller 150 may drive the first motor 111 in the normal mode, irrespective of the vehicle speed or the steering angular velocity, in S550. In addition, at the steering angular velocity not exceeding 180 deg/s, as indicated by NO in S530, the controller 150 may drive the first motor 111 in the normal mode, irrespective of the vehicle speed or the distance to a preceding vehicle, in S550. The above-described three cases may correspond to a situation in which additional power output is unnecessary, since evasion or lane changing may be enabled by the assistance steering power provided in the normal mode.

Returning to FIG. 21, if the vehicle speed exceeds 40 km/h, as indicated by YES in S510, the distance to a preceding vehicle is less than 50 m, as indicated by YES in S520, and the steering angular velocity exceeds 180 deg/s, as indicated by YES in S530, the apparatus may operate in the emergency mode. In the emergency mode, the higher the speed of the host vehicle is, the greater the necessity for rapid steering to a greater angle may be. In addition, the higher the steering angular velocity due to the steering of the driver is, the more emergent the situation may be. In addition, the shorter the distance to a preceding vehicle is, the more rapid the steering is required. Accordingly, with increases in the necessity of the rapid steering, the controller 150 may increase the assistance steering power output by the motor 110, so that the vehicle's wheel may be more rotated by the same amount of manipulation of the driver.

In an embodiment, the controller 150 may increase output by increasing a current supplied to the first motor 111. For example, the controller 150 may increase the assistance torque provided by the first motor 111 at ratios determined in accordance with vehicle speeds. Accordingly, the graph of the assistance torque provided by the first motor 111 gradually increases.

Alternatively, in another embodiment, the controller 150 may increase the output by supplying a current to the second motor 113. In this case, the controller 150 may control the first motor 111 and the second motor 113, so that a total of outputs from the first motor 111 and the second motor 113 increases at the ratios determined in accordance with vehicle speeds.

As described above, it is possible to provide an amount of assistance steering power suitable to the situation by selectively controlling the dual motors provided in the electric power steering apparatus depending on the traveling state of the vehicle. In addition, in a situation in which rapid lane changing is required depending on the traveling state of the vehicle, it is possible to provide a required amount of assistance steering power by driving both the dual motors, so that a large commercial vehicle can more rapidly change lanes.

Figure 22:
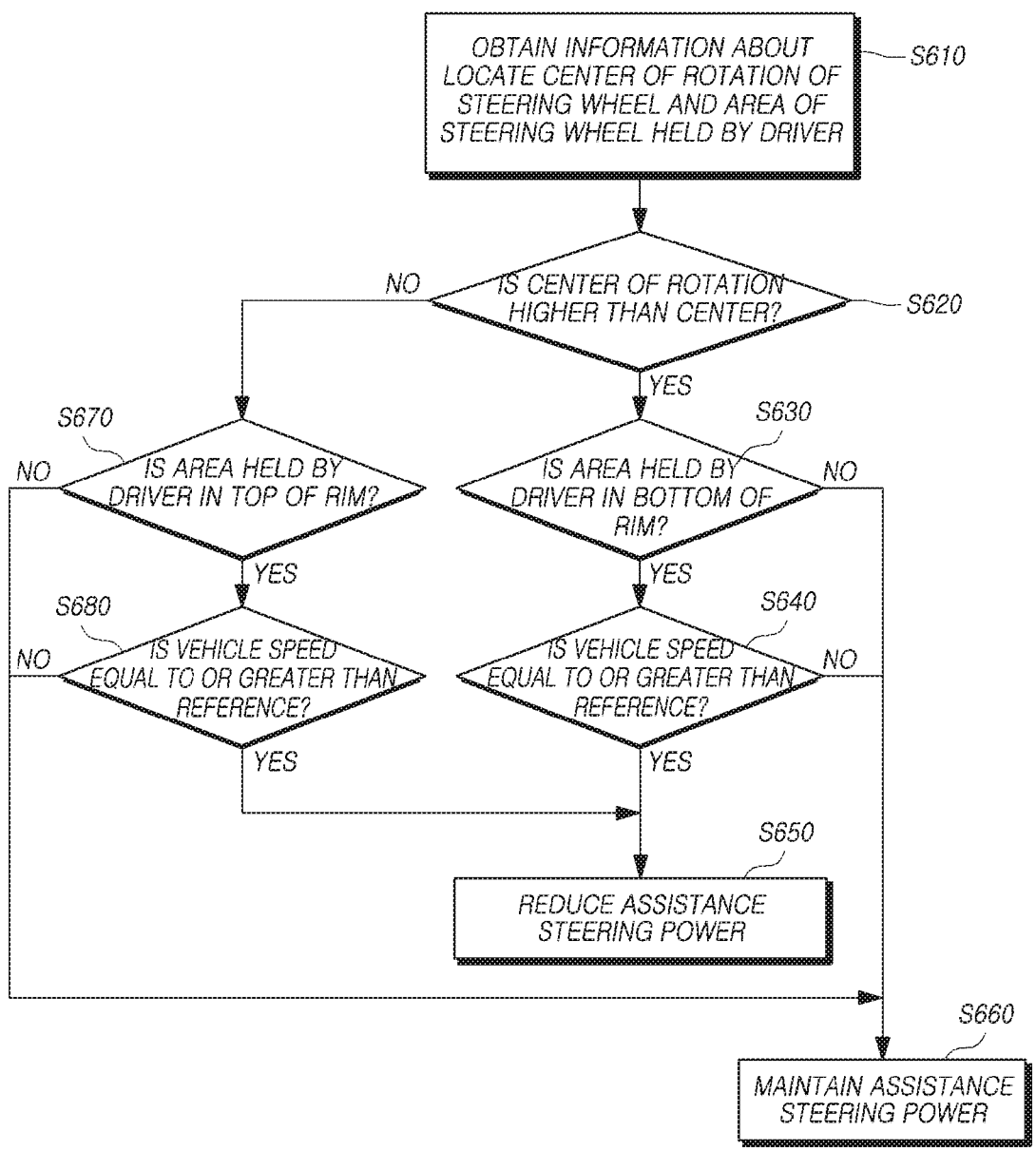
FIG. 22 is a flowchart illustrating a control method of an electric power steering apparatus depending on the center of rotation of the steering wheel according to another embodiment of the present disclosure.

FIG. 22 is a flowchart illustrating a control method of an electric power steering apparatus depending on the center of rotation of the steering wheel according to another embodiment of the present disclosure.

Referring to FIG. 22, the electric power steering apparatus may obtain information regarding the center of rotation of the steering wheel and information regarding an area of the steering wheel held by the driver in S610.

The electric power steering apparatus 의 sensor 130 may further include the first sensor obtaining the information regarding the center of rotation of the steering wheel. If the center of rotation of the steering wheel 180 moves, the first sensor may detect a position, to which the center of rotation has moved, and output information regarding the position to the controller 150.

The sensor 130 may further include the second sensor obtaining information an area of the steering wheel 180 held by the driver. The second sensor is implemented as a pressure sensor to detect the driver holding the top area 181 or the bottom area 182 of the rim and output information regarding the area held by the driver to the controller 150.

Returning to FIG. 22, the electric power steering apparatus may determine whether or not the center of rotation of the steering wheel is located above the center in S620.

In general, the steering wheel 180 may be mounted to rotate about the center. In an embodiment, the steering wheel 180 may be configured such that the center of rotation thereof is movable in the top-bottom direction about the center of the steering wheel. The movement of the center of rotation of the steering wheel 180 may be performed by a specific manipulation of the driver or under the control of an electric control unit.

If the center of rotation of the steering wheel 180 has moved upwards about the center of the steering wheel 180, as indicated by YES in S620, the controller 150 may determine whether or not the driver has held the bottom area of the rim in S630.

When the driver has held the bottom area 182 of the rim, as indicated by YES in S630, steering is performed at a curvature of a circle having a radius greater than the radius r of the rim, the steering effort is light. In this case, the controller 150 may determine whether the speed of the host vehicle is equal to or greater than a predetermined reference speed in S640.

If the host vehicle is traveling at a speed equal to or greater than the predetermined reference speed, as indicated by YES in S640, the controller 150 may control the motor 110 to reduce the amount of assistance steering power provided thereby in S650. For example, in the normal mode in which the first motor 111 is driven, the controller 150 may reduce the amount of assistance torque provided by the first motor 111 at ratios determined in accordance with respective vehicle speeds.

In the emergency mode in which both the first motor 111 and the second motor 113 are driven, the controller 150 may reduce the amount of assistance torque provided by the second motor 113. Alternatively, the controller 150 may reduce the overall amount of assistance torque provided by the first motor 111 and the second motor 113.

If the host vehicle is traveling at a speed slower than the predetermined reference speed, as indicated by NO in 5S40, the controller 150 may control the motor 110 so that the assistance steering power provided by the motor 110 maintained in S660.

Referring to the step S630 again, if the driver has held the top area of the rim, as indicated by NO in S630, the steering wheel is rotated about the center of rotation, at a curvature of a circle having a radius smaller than the radius r of the rim, and thus, the steering effort is obtuse. Accordingly, in a situation in which the assistance steering power is to be generally reduced as in the case of high-speed traveling of the host vehicle, the controller 15 may control the motor 110 so that the assistance steering power provided by the motor 110 is maintained.

Referring to the step S620 again, if the center of rotation of the steering wheel 180 has moved downward about the center of the steering wheel 180, as indicated by NO in S620, the controller 150 may determine whether or not the driver has held the top area of the rim in S670.

If the driver has held the top area of the rim, as indicated by YES in S670, the steering wheel is rotated about the center of rotation, at a curvature of a circle having a radius greater than the radius r of the rim, and thus the steering effort is light. In this case, the controller 150 may determine whether the speed of the host vehicle is equal to or greater than the predetermined reference speed in S680.

If the host vehicle is traveling at a speed equal to or greater than the predetermined reference speed, as indicated by YES in S680, the controller 150 may control the motor 110 to reduce the amount of assistance steering power provided thereby in S650. For example, in the normal mode in which the first motor 111 is driven, the controller 150 may reduce the amount of assistance torque provided by the first motor 111 at ratios determined in accordance with respective vehicle speeds.

In the emergency mode in which both the first motor 111 and the second motor 113 are driven, the controller 150 may reduce the amount of assistance torque provided by the second motor 113. Alternatively, the controller 150 may reduce the overall amount of assistance torque provided by the first motor 111 and the second motor 113.

If the host vehicle is traveling at a speed slower than the predetermined reference speed, as indicated by NO in S680, the controller 150 may control the motor 110 so that the assistance steering power provided by the motor 110 is maintained in S660.

Referring to the step S670 again, if the driver has held the bottom area of the rim, as indicated by NO in S670, the steering wheel may be rotated about the center of rotation, at a curvature of a circle having a radius smaller than the radius r of the rim, and thus, the steering effort is obtuse. Accordingly, in a situation in which the assistance steering power is to be generally reduced as in the case of high-speed traveling of the host vehicle, the controller 150 may control the motor 110 so that the assistance steering power provided by the motor 110 is maintained in S680.

As described above, it is possible to control the amount of assistance steering power provided according to the mounting position of the steering wheel by controlling the dual motors provided in the electric power steering apparatus depending on the center of rotation of the steering wheel and the area held by the driver.

The present disclosure as described above may be realized in the form of computer readable codes recorded in a computer readable medium in which a program is recorded. The computer readable medium may be any type of recording device in which data that can read by a computer is stored. Examples of the computer readable medium may include, but are not limited to, a hard disk drive (HOD), a solid state disk (SSD), a silicon disk drive (SDD), a read-only memory (ROM), a random access memory (RAM), a compact disc read-only memory (CD-ROM), a magnetic tape, a floppy disk, and an optical data storage, and may be in the form of carrier waves (e.g. transmissions via the Internet).

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. An electric power steering apparatus comprising:
a motor comprising a first motor coupled to a worm wheel of a steering shaft and configured to rotate the worm wheel to move a rack and a second motor coupled to the worm wheel of the steering shaft and configured to rotate the worm wheel to move the rack in synchronization with the first motor;
a sensor comprising a torque angle sensor configured to detect a torque value and a steering angle in response to manipulation of a steering wheel and an angle sensor configured to detect an angle of rotation of a sector shaft; and
a controller configured to control the first and second motors, respectively, in response to the manipulation of the steering wheel,
wherein the controller is configured to calculate an amount of compensation rotation of the motor based on the detected steering angle and the detected angle of rotation, and control an amount of rotation of the motor in accordance with the calculated amount of compensation rotation, and
wherein the controller is configured to,
when the calculated amount of compensation rotation is less than a predetermined value, only drive the first motor to move the rack in accordance with the calculated amount of compensation rotation, and
when the calculated amount of compensation rotation is equal to or greater than the predetermined value, drive both of the first motor and the second motor to move the rack in accordance with the calculated amount of compensation rotation.

2. The electric power steering apparatus according to claim 1, wherein the motor is driven to transfer power to a ball screw of a second reducer having a power transmission structure comprised of the ball screw and a ball nut via a first reducer having a power transmission structure provided by engagement of worm gears and a worm wheel, so that the power is transferred to the rack.

3. The electric power steering apparatus according to claim 2, wherein the torque angle sensor is connected to the steering shaft, in a location between the steering wheel and the first reducer, to detect the torque value and the steering angle due to torsion and rotation of the steering shaft.

4. The electric power steering apparatus according to claim 2, wherein the angle sensor is disposed on the sector shaft to detect the angle of rotation of the sector shaft, the sector shaft rotating in response to sliding of the ball nut of the second reducer.

5. The electric power steering apparatus according to claim 4, wherein the angle sensor includes:
one or more magnets disposed on surface portions of a sector gear provided on an outer circumferential surface of the sector shaft to be engaged with the ball nut; and
a magnetic sensor detecting magnetic force generated by the magnets, response to the sector gear rotating along with the sliding of the ball nut.

6. The electric power steering apparatus according to claim 5, the magnetic sensor disposed in a housing to face the magnets, the housing surrounding the sector shaft and the sector gear.

7. The electric power steering apparatus according to claim 1, wherein the controller configured to calculate a first amount of rotation of a vehicle's wheel in accordance with the detected steering angle and a second amount of rotation of the vehicle's wheel in accordance with the detected angle of rotation, calculate the amount of compensation rotation by comparing the first amount of rotation and the second amount of rotation, and apply a compensation current based on the amount of compensation rotation to the motor.

8. The electric power steering apparatus according to claim 7, wherein the controller is configured to perform position control to the motor by proportional integral control.

9. A control method of an electric power steering apparatus of a vehicle, the method comprising:
controlling a motor in response to manipulation of a steering wheel, wherein the motor comprising a first motor coupled to a worm wheel of a steering shaft and configured to rotates the worm wheel to move a rack and a second motor coupled to the worm wheel of the steering shaft and configured to rotate the worm wheel to move the rack in synchronization with the first motor;
detecting a torque value and a steering angle in response to the manipulation of the steering wheel;
detecting an angle of rotation of a sector shaft;
calculating an amount of compensation rotation of the motor by comparing the steering angle and the angle of rotation; and
controlling, in accordance with the amount of compensation rotation, a first amount of rotation of the first motor and a second amount of rotation of the second motor, respectively
wherein the controller,
when the calculated amount of compensation rotation is less than a predetermined value, only drives the first motor to move the rack in accordance with the calculated amount of compensation rotation, and
when the calculated amount of compensation rotation is equal to or greater than the predetermined value, drives both of the first motor and the second motor to move the rack in accordance with the calculated amount of compensation rotation.

10. The control method according to claim 9, wherein the detection of the torque value and the steering angle comprises detecting the torque value and the steering angle in response to torsion and rotation of the steering shaft.

11. The control method according to claim 10, wherein the detection of the angle of rotation of the sector shaft comprises detecting the angle of rotation of the sector shaft by detecting magnetic force generated by one or more magnets disposed on the sector shaft.

12. An electric power steering apparatus comprising:
a motor comprising a first motor coupled to a worm wheel of a steering shaft and configured to rotate the worm wheel to move a rack and a second motor coupled to the worm wheel of the steering shaft and configured to rotate the worm wheel to move the rack in synchronization with the first motor;
a sensor comprising a vehicle speed sensor configured to obtain a vehicle speed of a host vehicle, a steering angle sensor configured to obtain a steering angular velocity due to manipulation of a steering wheel, and a front sensor configured to obtain a distance to a preceding vehicle; and
a controller configured to control an operation of the first motor and an operation of the second motor, respectively, so that the vehicle's wheel is steered in response to the manipulation of the steering wheel,
wherein the controller is configured to:
determine a normal mode and an emergency mode to drive the motor in accordance with at least one selected from among the vehicle speed, the steering angular velocity, the distance to a preceding vehicle, or combinations thereof, only drive the first motor in the normal node, and drive both the first motor and the second motor in an emergency mode.

13. The electric power steering apparatus according to claim 12, wherein the motor is configured to drive to transfer power to a ball screw of a second reducer having a power transmission structure comprised of the ball screw and a ball nut via a first reducer having a power transmission structure provided by engagement of worm gears and a worm wheel, so that the power is transferred to the rack.

14. The electric power steering apparatus according to claim 13, wherein the sensor further comprises an angle sensor disposed on a sector shaft to detect an angle of rotation of the sector shaft, the sector shaft rotating in response to sliding of the ball nut.

15. The electric power steering apparatus according to claim 14, wherein the controller is configured to calculate additional assistance steering power required in the emergency mode, in accordance with a steering angle of the steering wheel and the angle of rotation of the sector shaft, and drives the second motor to provide the additional assistance steering power.

16. The electric power steering apparatus according to claim 12, wherein the controller is configured to operate in the emergency mode when the vehicle speed is equal to or greater than a predetermined reference value, the steering angular velocity is equal to or greater than a predetermined reference value, and the distance to a preceding vehicle is equal to or less than a predetermined reference value.

17. The electric power steering apparatus according to claim 12, wherein the controller is configured to determine the emergency mode to increase assistance steering power with increases in the vehicle speed, increases in the steering angular velocity, and decreases in the distance to a preceding vehicle.

18. The electric power steering apparatus according to claim 12, wherein a center of rotation of the steering wheel is movable up and down about a center of the steering wheel.

19. The electric power steering apparatus according to claim 18, wherein the sensor comprises a first sensor configured to obtain position of the center of rotation of the steering wheel and a second sensor configured to detect an area of the steering wheel held by a driver, and wherein the controller is configured to control driving of the first motor and the second motor in accordance with the vehicle speed, the position of the center of rotation, and the area of the steering wheel held the driver.

20. The electric power steering apparatus according to claim 12, wherein the sensor further comprises an angle sensor configured to obtain an angle of rotation of a sector shaft, and wherein the controller is configured to calculate an amount of compensation rotation of the motor in accordance with a steering angle of the steering wheel and an angle of rotation of a sector shaft, and control an amount of rotation of the motor in accordance with the amount of compensation rotation.

\* \* \* \* \*